(12) United States Patent
Kobashi

(10) Patent No.: US 11,216,232 B2
(45) Date of Patent: Jan. 4, 2022

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Kazufumi Kobashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/810,734

(22) Filed: Mar. 5, 2020

(65) Prior Publication Data
US 2020/0293253 A1 Sep. 17, 2020

(30) Foreign Application Priority Data
Mar. 15, 2019 (JP) .............................. JP2019-048748

(51) Int. Cl.
*G06F 3/12* (2006.01)

(52) U.S. Cl.
CPC .......... *G06F 3/1275* (2013.01); *G06F 3/1211* (2013.01); *G06F 3/1264* (2013.01)

(58) Field of Classification Search
CPC . G06F 3/1275; G06F 3/1204; H04N 1/00411; H04N 1/00413; H04N 1/00466; H04N 1/0048; H04N 1/00482
See application file for complete search history.

(56) References Cited

U.S. PATENT DOCUMENTS

| | | | | |
|---|---|---|---|---|
| 2007/0035770 A1* | 2/2007 | Tomita | ..................... | B42C 7/00 358/1.18 |
| 2009/0002741 A1* | 1/2009 | Ozawa | .................. | G06F 3/1247 358/1.13 |
| 2010/0060909 A1* | 3/2010 | Conescu | ................ | G06Q 10/06 358/1.9 |
| 2011/0279392 A1* | 11/2011 | Yamaguchi | .......... | G03G 15/502 345/173 |

FOREIGN PATENT DOCUMENTS

| JP | 2008-219735 A | 9/2008 |
|---|---|---|
| JP | 2013-091229 A | 5/2013 |
| JP | 2014-164765 A | 9/2014 |

\* cited by examiner

*Primary Examiner* — Moustapha Diaby
(74) *Attorney, Agent, or Firm* — Canon U.S.A., Inc. IP Division

(57) ABSTRACT

A workflow including a plurality of work processes for producing a product is generated for each of a plurality of product types, a setting of a parameter for each of the work processes is received by a user operation, and a preview is displayed using the received setting and predetermined dummy data. A designation of one of a plurality of pieces of document data is received by a user operation, and a preview is displayed by replacing the dummy data with the designated document data.

12 Claims, 30 Drawing Sheets

FIG.5A

WORKFLOW SETTING APPLICATION

MANAGEMENT SCREEN

501 — CREATE NEW | 502 — EDIT | 503 — DELETE

WORKFLOW LIST

504 —

| ID | NAME | MERCHANDISE TYPE | PARTS |
|---|---|---|---|
| 1 | XXX MANUAL | 99900001 | 99900001 |
| 2 | LEAFLET XXXX | ABCXXXX2 | ABCXXXX2 |
| 3 | XXXXX CATALOG | .... | .... |
| 4 | XXX BOOKLET | .... | .... |
| 5 | SIGNBOARD XXXX | .... | .... |
|  |  |  |  |

FIG.5B

WORKFLOW SETTING APPLICATION

CREATE NEW SCREEN

601 — NAME: ◯◯ BOOK

602 — MERCHANDISE TYPE: BOOK ▼

603 —
- PART: FRONT COVER ▼ [+]
- PART: BODY ▼ [+] [−]
- PART: TITLE PAGE ▼ [+] [−]
- PART: BOOK BAND ▼ [+] [−]

OK (604) | CANCEL (605)

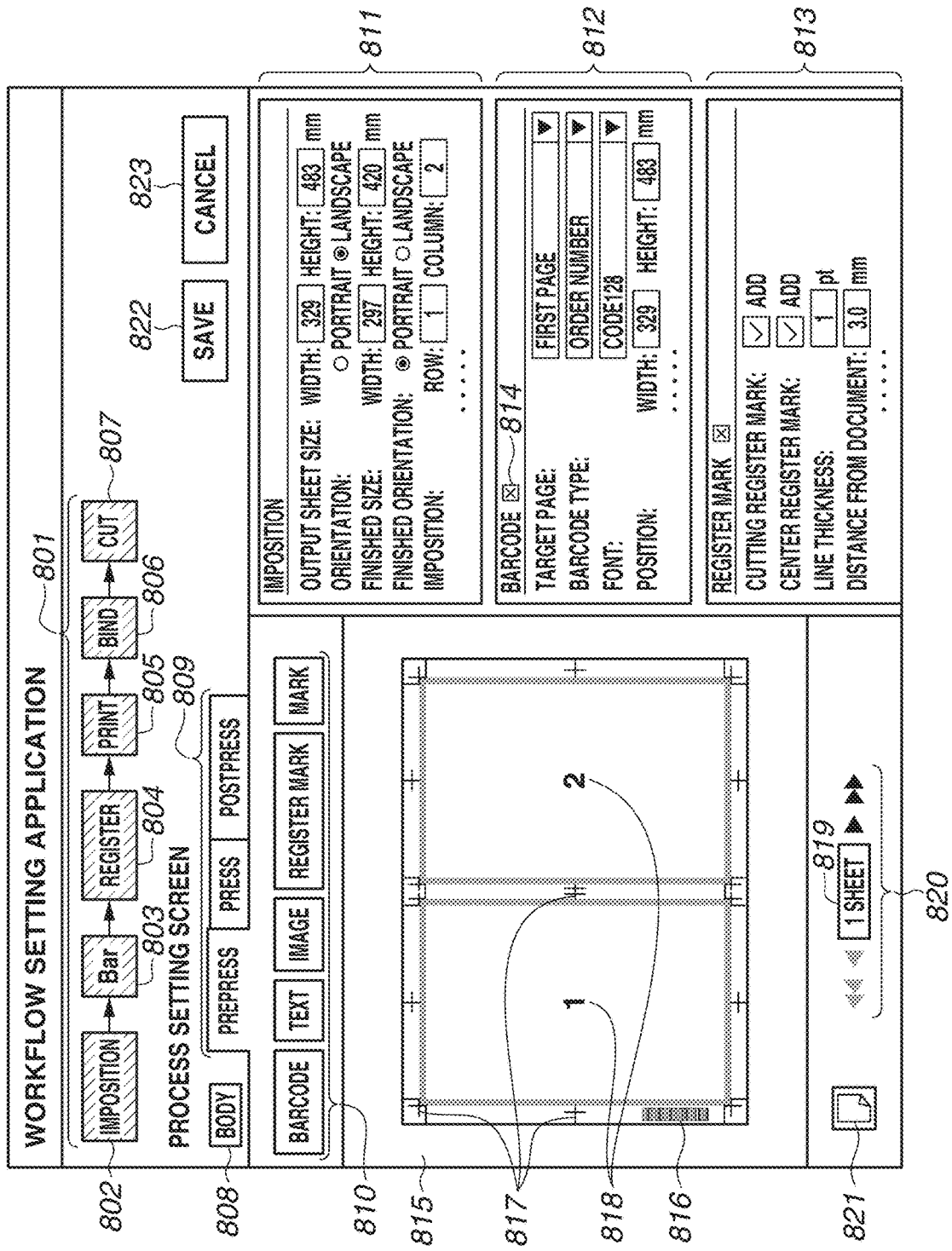

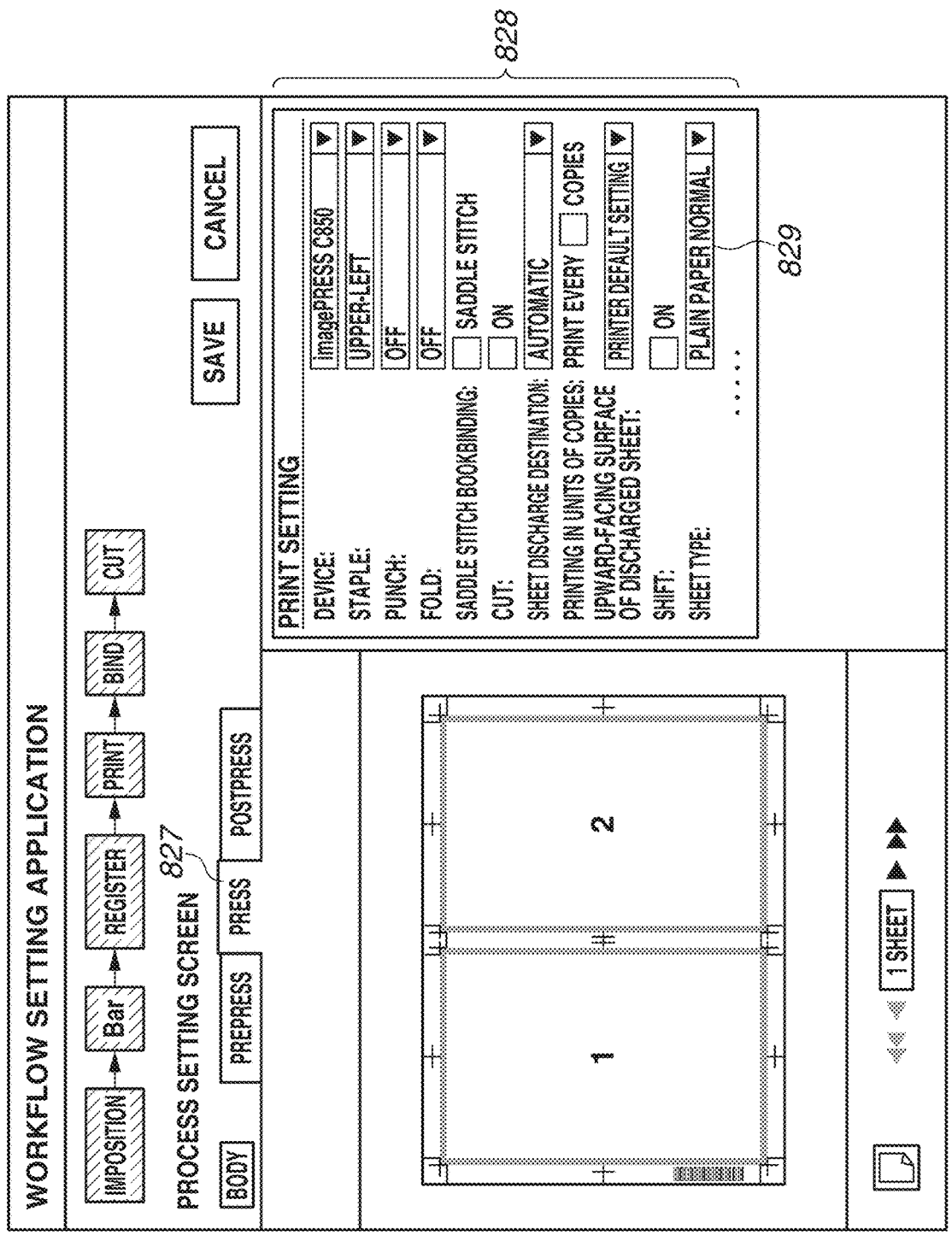

FIG.10

| PART | AFFECTED BY | | COMBINING ORDER |
| --- | --- | --- | --- |
| | DOCUMENT DATA | SHEET TYPE | |
| JACKET | ✗ | ✓ | 4 |
| FRONT COVER | ✗ | ✓ | 3 |
| TITLE PAGE | ✗ | ✗ | 5 |
| BOOK BAND | ✗ | ✓ | 2 |
| SLIP | ✗ | ✗ | — |
| BODY | ✓ | ✓ | 1 |
| ... | ... | ... | ... |

FIG.12

| ID | NAME | MERCHANDISE TYPE | PART 1 | PART 1 ID | PART 2 | PART 2 ID | PART 3 | PART 3 ID | PART 4 | PART 4 ID |
|---|---|---|---|---|---|---|---|---|---|---|
| 001 | XXX MANUAL | MANUAL | FRONT COVER | 001-C001 | BODY | 001-B001 | — | — | — | — |
| 002 | LEAFLET XXXX | LEAFLET | BODY | 002-B001 | — | — | — | — | — | — |
| 003 | XXXXX CATALOG | CATALOG | FRONT COVER | 003-C001 | BODY | 003-B001 | — | — | — | — |
| 004 | XXX BOOKLET | BOOKLET | FRONT COVER | 004-C001 | BODY | 004-B001 | TITLE PAGE | 004-T001 | BOOK BAND | 004-BB001 |
| 005 | SIGNBOARD XXXX | SIGNBOARD | BODY | 005-B001 | — | — | — | — | — | — |
| ⋮ | ⋮ | ⋮ | ⋮ | ⋮ | ⋮ | ⋮ | ⋮ | ⋮ | ⋮ | ⋮ |

FIG.13A

| ID | PREPRESS ||||| PRESS ||||
|---|---|---|---|---|---|---|---|---|---|
| | IMPOSITION |||| BARCODE || REGISTER MARK || PRINT ||
| | SHEET WIDTH | SHEET HEIGHT | SHEET ORIENTATION | FINISHED WIDTH | FINISHED HEIGHT | FINISHED ORIENTATION | ... | PAGE | FONT | ... | CUTTING | CENTER | ... | SHEET DISCHARGE DESTINATION | SHEET TYPE | ... |
| 001-C001 | 329 | 483 | LANDSCAPE | 297 | 420 | LANDSCAPE | ... | — | — | ... | ON | ON | ... | TRAY 1 | CARDBOARD NORMAL | ... |
| 003-C001 | 329 | 483 | LANDSCAPE | 297 | 420 | LANDSCAPE | ... | — | — | ... | ON | ON | ... | AUTO | PLAIN PAPER NORMAL | ... |
| 004-C001 | 329 | 483 | LANDSCAPE | 297 | 420 | LANDSCAPE | ... | — | — | ... | ON | ON | ... | TRAY 2 | COATED PAPER | ... |
| ... | ... | ... | ... | ... | ... | ... | ... | ... | ... | ... | ... | ... | ... | ... | ... | ... |

| POSTPRESS |||||||||||||
|---|---|---|---|---|---|---|---|---|---|---|---|---|
| FOLD || CUT & CREASE ||| SADDLE STITCHING ||| PERFECT BINDING ||| THREE-SIDE CUTTING |||
| CONVEYANCE DIRECTION | FOLDING METHOD | X1 | Y1 | ... | TARGET PART 1 | TARGET PART 2 | ... | TARGET PART 1 | TARGET PART 2 | ... | WIDTH BEFORE CUTTING | HEIGHT BEFORE CUTTING | WIDTH AFTER CUTTING |
| — | — | — | — | ... | — | — | ... | — | — | ... | — | — | — |
| — | — | — | — | ... | — | — | ... | — | — | ... | — | — | — |
| — | — | — | — | ... | — | — | ... | — | — | ... | — | — | — |
| ... | ... | ... | ... | ... | ... | ... | ... | ... | ... | ... | ... | ... | ... |

FIG. 13B

| ID | PREPRESS ||||| BARCODE || REGISTER MARK || PRESS |||
|---|---|---|---|---|---|---|---|---|---|---|---|---|
| | IMPOSITION |||| ... | | | | | PRINT |||
| | SHEET WIDTH | SHEET HEIGHT | SHEET ORIENTATION | FINISHED WIDTH | FINISHED HEIGHT | FINISHED ORIENTATION | PAGE | FONT | CUTTING | CENTER | SHEET DISCHARGE DESTINATION | SHEET TYPE | ... |
| 001-B001 | 224 | 335 | PORTRAIT | 210 | 297 | PORTRAIT | — | — | ON | ON | AUTO | PLAIN PAPER NORMAL | ... |
| 002-B001 | 224 | 335 | PORTRAIT | 210 | 297 | PORTRAIT | — | — | ON | ON | AUTO | PLAIN PAPER NORMAL | ... |
| 003-B001 | 224 | 335 | PORTRAIT | 210 | 297 | PORTRAIT | FIRST | CODE 64 | ON | ON | AUTO | PLAIN PAPER NORMAL | ... |
| 004-B001 | 224 | 335 | PORTRAIT | 210 | 297 | PORTRAIT | FIRST | CODE 128 | ON | ON | TRAY 2 | COATED PAPER | ... |
| 005-B001 | 329 | 483 | LANDSCAPE | 297 | 420 | LANDSCAPE | — | — | ON | ON | TRAY 2 | PLAIN PAPER NORMAL | ... |
| ... | ... | ... | ... | ... | ... | ... | ... | ... | ... | ... | ... | ... | ... |

| POSTPRESS |||||||||||
|---|---|---|---|---|---|---|---|---|---|---|
| FOLD || CUT & CREASE ||| SADDLE STITCHING ||| PERFECT BINDING ||| THREE-SIDE CUTTING |||
| CONVEYANCE DIRECTION | FOLDING METHOD | X1 | Y1 | ... | TARGET PART 1 | TARGET PART 2 | ... | TARGET PART 1 | TARGET PART 2 | ... | WIDTH BEFORE CUTTING | HEIGHT BEFORE CUTTING | WIDTH AFTER CUTTING |
| — | — | — | — | ... | 001-C001 | — | ... | — | — | ... | — | — | — |
| LEFT | F2-1 | — | — | ... | — | — | ... | — | — | ... | — | — | — |
| — | — | — | — | ... | 003-C001 | — | ... | — | — | ... | — | — | — |
| — | — | — | — | ... | — | — | ... | 004-C001 | 004-T001 | ... | 329 | 483 | 297 |
| — | — | — | — | ... | — | — | ... | — | — | ... | — | — | — |
| ... | ... | ... | ... | ... | ... | ... | ... | ... | ... | ... | ... | ... | ... |

FIG. 14A

| ID | PREPRESS | | | | | | | | | PRESS | | |
|---|---|---|---|---|---|---|---|---|---|---|---|---|
| | IMPOSITION | | | | BARCODE | | REGISTER MARK | | | PRINT | | |
| | SHEET WIDTH | SHEET HEIGHT | SHEET ORIENTATION | FINISHED WIDTH | FINISHED HEIGHT | FINISHED ORIENTATION | ... | PAGE | FONT | ... | CUTTING | CENTER | ... | SHEET DISCHARGE DESTINATION | SHEET TYPE | ... |
| 004-T001 | 224 | 335 | PORTRAIT | 210 | 297 | PORTRAIT | ... | — | — | ... | ON | ON | ... | TRAY 1 | PLAIN PAPER NORMAL | ... |
| ... | ... | ... | ... | ... | ... | ... | ... | ... | ... | ... | ... | ... | ... | ... | ... | ... |

| POSTPRESS | | | | | | | | | | |
|---|---|---|---|---|---|---|---|---|---|---|
| FOLD | | CUT & CREASE | | | SADDLE STITCHING | | | PERFECT BINDING | | THREE-SIDE CUTTING | | |
| CONVEYANCE DIRECTION | FOLDING METHOD | ... | X1 | Y1 | ... | TARGET PART 1 | TARGET PART 2 | ... | TARGET PART 1 | TARGET PART 2 | ... | WIDTH BEFORE CUTTING | HEIGHT BEFORE CUTTING | WIDTH AFTER CUTTING | ... |
| — | — | ... | — | — | ... | — | — | ... | — | — | ... | — | — | — | ... |
| ... | ... | ... | ... | ... | ... | ... | ... | ... | ... | ... | ... | ... | ... | ... | ... |

FIG. 14B

| ID | PREPRESS ||||||||| PRESS |||
| --- | --- | --- | --- | --- | --- | --- | --- | --- | --- | --- | --- | --- |
| | IMPOSITION |||| BARCODE || REGISTER MARK || | PRINT || |
| | SHEET WIDTH | SHEET HEIGHT | SHEET ORIENTATION | FINISHED WIDTH | FINISHED HEIGHT | FINISHED ORIENTATION | PAGE | FONT | ... | CUTTING | CENTER | ... | SHEET DISCHARGE DESTINATION | SHEET TYPE | ... |
| 004-BB001 | 594 | 80 | PORTRAIT | 560 | 60 | PORTRAIT | — | — | ... | ON | ON | ... | TRAY 1 | COATED PAPER | ... |
| ... | ... | ... | ... | ... | ... | ... | ... | ... | ... | ... | ... | ... | ... | ... | ... |

| POSTPRESS |||||||||||
| --- | --- | --- | --- | --- | --- | --- | --- | --- | --- | --- |
| FOLD || CUT & CREASE ||| SADDLE STITCHING ||| PERFECT BINDING ||| THREE-SIDE CUTTING |||
| CONVEYANCE DIRECTION | FOLDING METHOD | X1 | Y1 | ... | TARGET PART 1 | TARGET PART 2 | ... | TARGET PART 1 | TARGET PART 2 | ... | WIDTH BEFORE CUTTING | HEIGHT BEFORE CUTTING | WIDTH AFTER CUTTING |
| — | — | 20 | 5 | ... | — | — | ... | — | — | ... | — | — | — |
| ... | ... | ... | ... | ... | ... | ... | ... | ... | ... | ... | ... | ... | ... |

FIG.15

| NAME | GRAMMAGE | SURFACE PROPERTY | COLOR | ... |
|---|---|---|---|---|
| PLAIN PAPER NORMAL | 70 | HIGH-QUALITY PAPER | WHITE | ... |
| CARDBOARD | 170 | HIGH-QUALITY PAPER | WHITE | ... |
| COATED PAPER | 140 | COATED | WHITE | ... |
| COLORED PAPER | 80 | HIGH-QUALITY PAPER | BLUE | ... |
| MATTE COATED PAPER | 110 | MATTE COATED | WHITE | ... |
| ... | ... | ... | ... | ... |

FIG.16

| PARTS | SPINE WIDTH |
|---|---|
| JACKET | 0.2 |
| FRONT COVER | 0.2 |
| BOOK BAND | — |
| TITLE PAGE 1 | 0.2 |
| TITLE PAGE 2 | 0.2 |
| BODY | 10 |
| ... | ... |

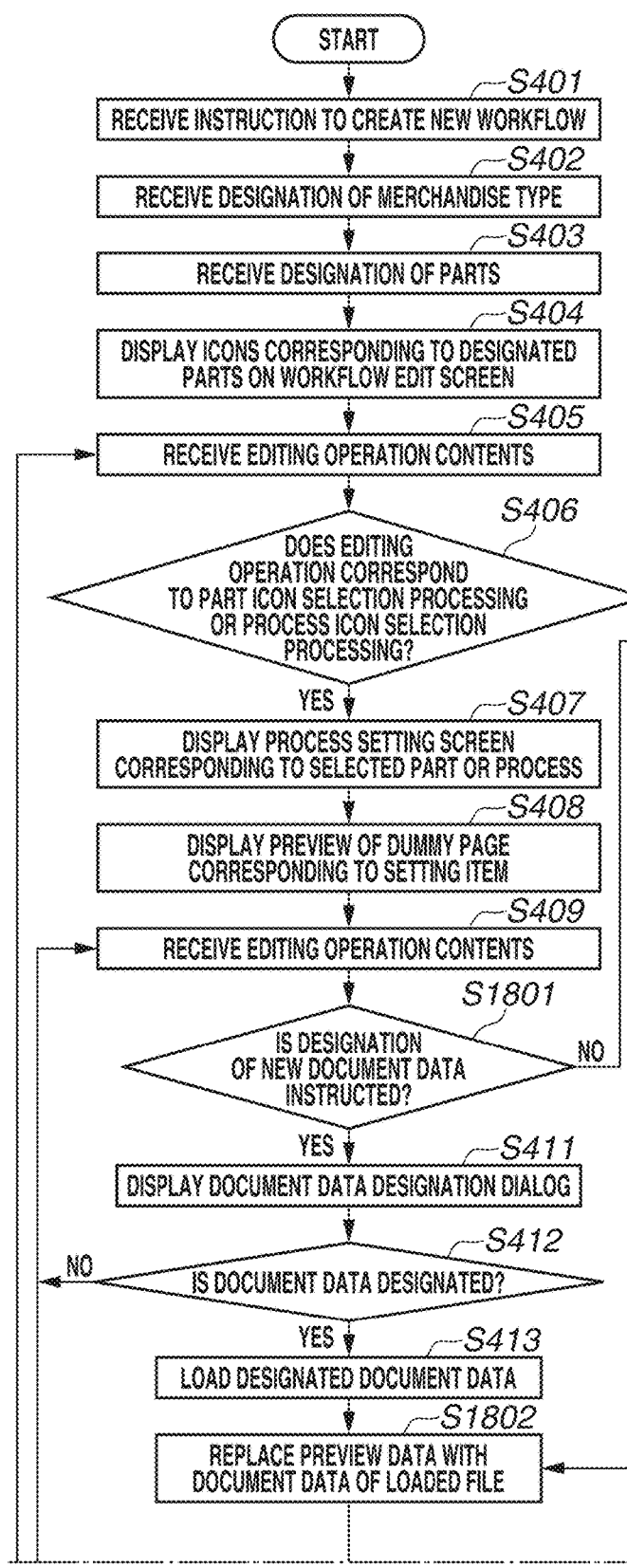
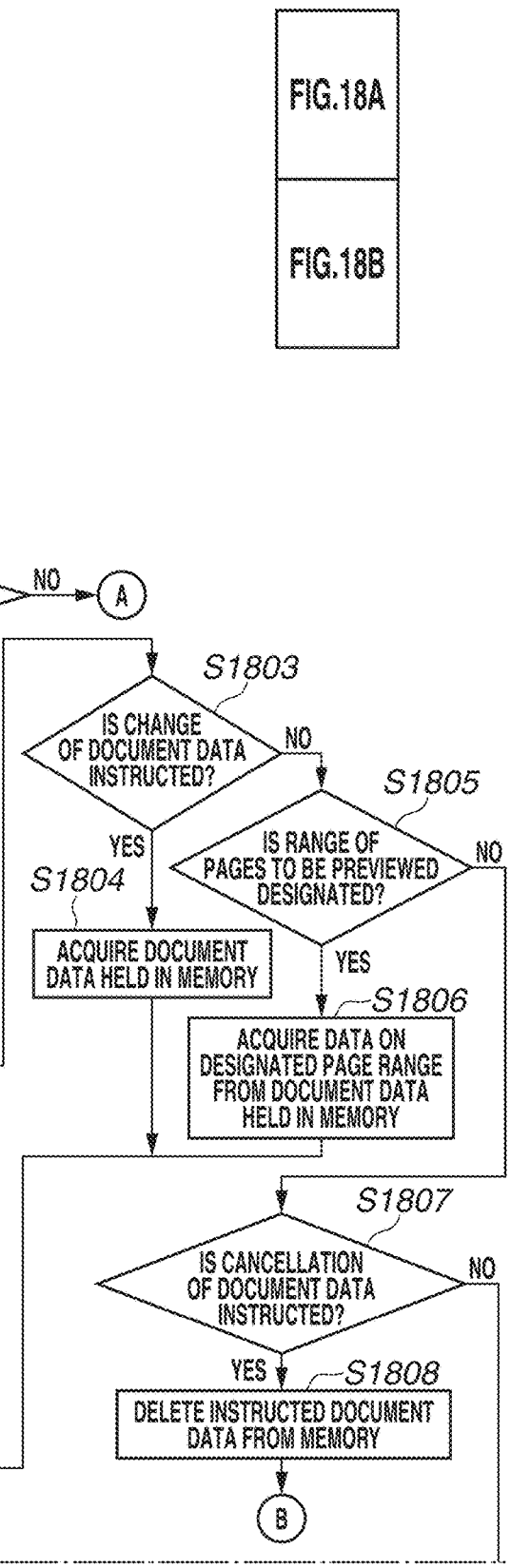
FIG.18A
FIG.18
FIG.18A
FIG.18B

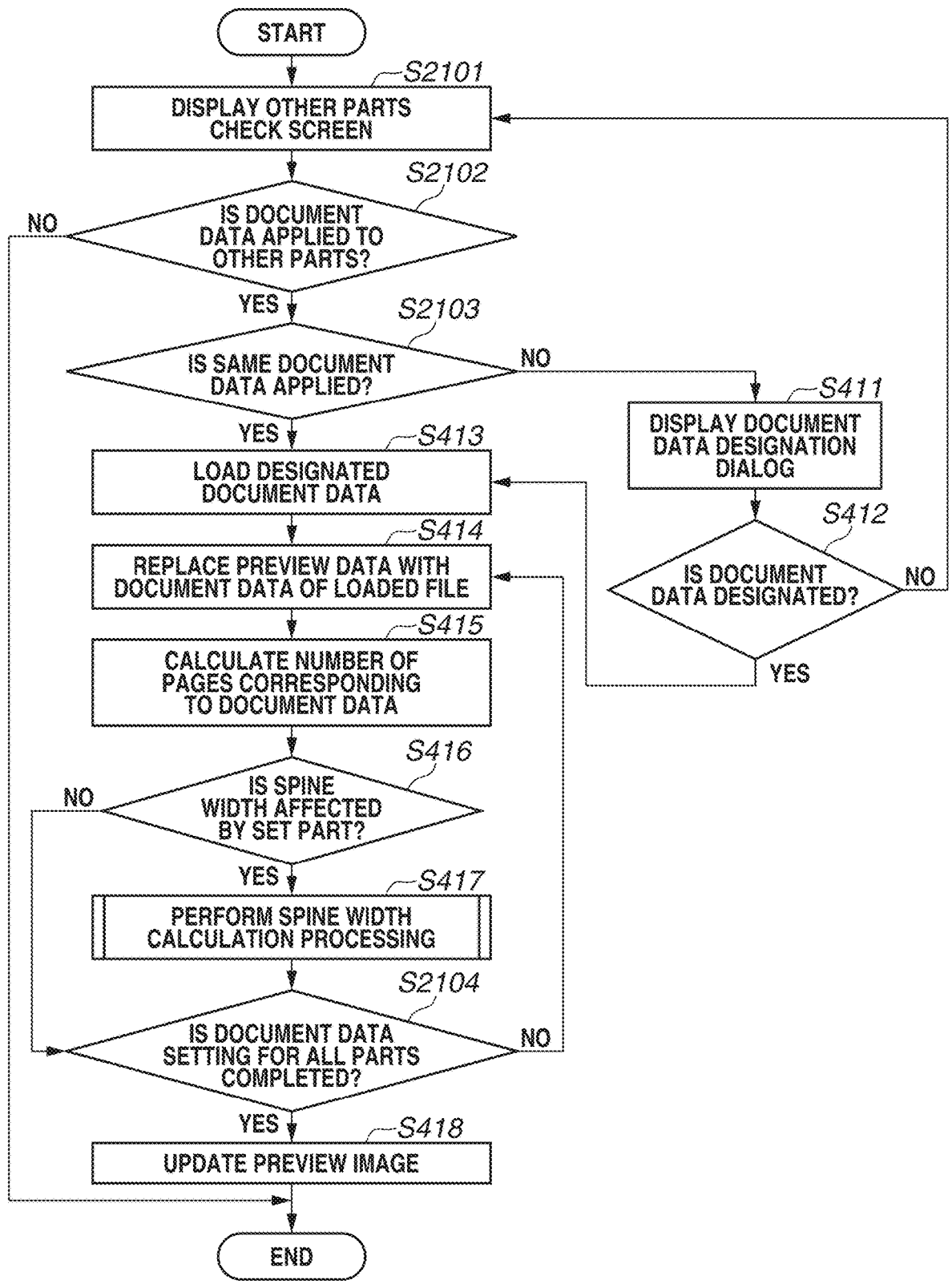

INFORMATION PROCESSING APPARATUS, CONTROL METHOD THEREOF, AND STORAGE MEDIUM

BACKGROUND

Field

The present disclosure relates to a setting for a workflow for producing a product in commercial printing.

Description of the Related Art

In commercial printing, a workflow setting includes allocation of parts (a front cover, a body, a title page, a book band, etc.) for producing a merchandise as a product, and allocation of processes (imposition, barcoding, printing, folding, perfect binding, three-side cutting, etc.) for each of the parts. Using the set workflow, a plurality of ordered jobs is automatically processed. Print workflow setting software discussed in Japanese Patent Application Laid-Open No. 2014-164765 enables a user to make a workflow setting by randomly combining icons each of which indicate a process, using a graphical user interface (GUI).

SUMMARY

A workflow is not used for processing certain order data, but is used for processing orders received from a plurality of customers. Accordingly, in the print workflow setting software, actual order data is not taken into consideration when settings are made for imposition and post-processing. Therefore, in the print workflow setting software, for example, if a barcode position is set and printing is performed using document data of actual order data, an inconveniences such as overlapping of the barcode and an image of document data at the barcode position may occur. This raises an issue that determination of whether a workflow setting is required and correction of a parameter for the workflow is performed after a test printing using actual order data and checking an output product.

In view of the above-described circumstances, the present disclosure features enabling a determination of whether there is a need to make a setting for a workflow including a plurality of work processes each for producing a different product type of a product, without performing printing using document data to be printed for the workflow.

According to an aspect of the present disclosure, an information processing apparatus includes a generation unit configured to generate a workflow for each of a plurality of product types, the workflow including a plurality of work processes for producing a product, a first reception unit configured to receive a setting of a parameter for each of the work processes by a user operation, a first preview display unit configured to display a preview using the setting received by the first reception unit and predetermined dummy data, a second reception unit configured to receive a designation of one of a plurality of pieces of document data by a user operation, and a second preview display unit configured to display a preview of the document data designated via the second reception unit by replacing the dummy data with the designated document data.

Further features of the present disclosure will become apparent from the following description of exemplary embodiments with reference to the attached drawings.

BRIEF DESCRIPTION OF THE DRAWINGS

FIG. 5A is a diagram illustrating an example of a workflow management screen for a workflow setting application. FIG. 5B is a diagram illustrating an example of a create new screen.

FIGS. 8A, 8B, and 8C are diagrams each illustrating an example of a workflow process setting screen for the workflow setting application.

FIG. 10 is a diagram illustrating an example of a spine width information table.

FIG. 12 is a diagram illustrating an example of a workflow information table.

FIGS. 13A and 13B are diagrams each illustrating an example of a front cover information table and a body information table.

FIGS. 14A and 14B are diagrams each illustrating an example of a title page information table and a book band information table.

FIG. 15 is a diagram illustrating an example of a sheet information table.

FIG. 16 is a diagram illustrating an example of a spine width value table.

FIG. 21 is a flowchart illustrating processing for designating document data for other parts.

DESCRIPTION OF THE EMBODIMENTS

Modes for carrying out the present disclosure will be described below with reference to the accompanying drawings.

Figure 1:
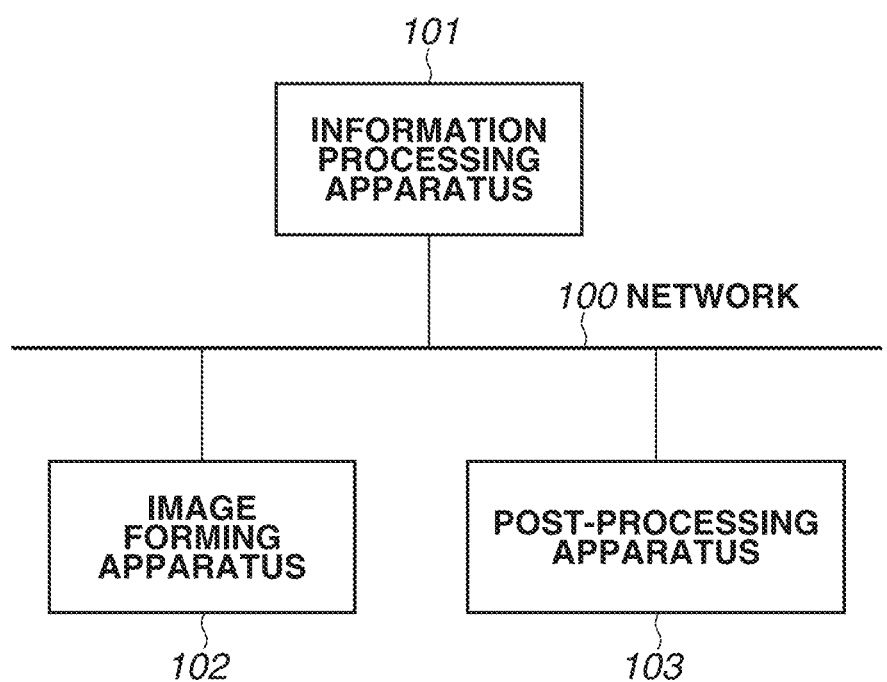
FIG. 1 is a system configuration diagram according to a first exemplary embodiment of the present disclosure.

FIG. 1 is a system configuration diagram according to a first exemplary embodiment of the present disclosure. The system configuration according to the first exemplary embodiment includes an information processing apparatus 101, an image forming apparatus 102, and a post-processing apparatus 103. The information processing apparatus 101, the image forming apparatus 102, and the post-processing apparatus 103 are connected to each other via a network 100. The image forming apparatus 102 analyzes print data transmitted from the information processing apparatus 101 and the like, converts the print data into a dot image for each page, and prints the dot image. A printed material output from the image forming apparatus 102 is delivered to the post-processing apparatus 103 by carrying the printed material by an operator, or is delivered to the post-processing apparatus 103 using a belt conveyor. The post-processing apparatus 103 can communicate with the image forming apparatus 102 and the information processing apparatus 101 via the network 100. The post-processing apparatus 103 performs processes, such as cutting, creasing, folding, bookbinding, or perfect binding, on the received printed material. A plurality of post-processing apparatuses 103 can also be used to perform bookbinding processing and then cut the printed material. FIG. 1 illustrates an example where one information processing apparatus 101, one image forming apparatus 102, and one post-processing apparatus 103 are provided. However, any number of information processing apparatuses 101, image forming apparatuses 102, and post-processing apparatuses 103 can be arranged. For example, printed materials output from a plurality of image forming apparatuses may be processed by a plurality of post-processing apparatuses 103.

Figure 2A:
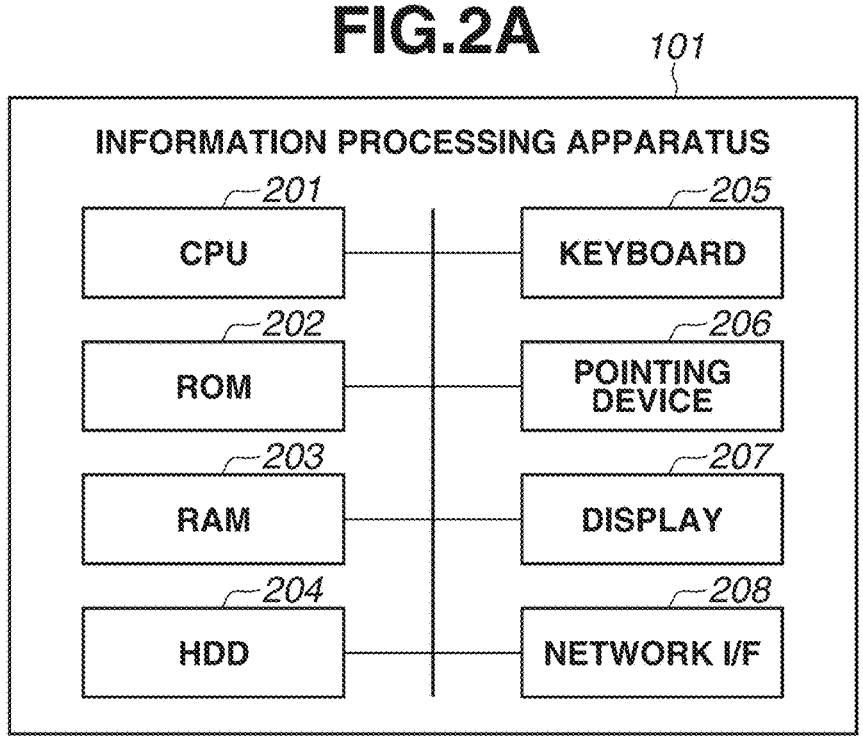
FIG. 2A is a hardware configuration diagram illustrating an information processing apparatus according to the first exemplary embodiment.

FIG. 2A is a hardware configuration diagram illustrating the information processing apparatus 101. A central processing unit (CPU) 201 reads out control programs stored in a read-only memory (ROM) 202, and executes various control processes. A random access memory (RAM) 203 is used as a temporary storage area such as a main memory or a work area for the CPU 201. A hard disk drive (HDD) 204 stores image data and various programs. A keyboard 205 is an input device that functions as an instruction input unit. The keyboard 205 is used to instruct, for example, inputting of control commands or text for an application to be described below according to an exemplary embodiment of the present disclosure. A pointing device 206 is an input device and also functions as an instruction input unit, like the keyboard 205. The pointing device 206 is used to instruct inputting of control commands for the application to be described below according to the exemplary embodiment. A display 207 is an output device that functions as a display unit. The display 207 displays, for example, commands input from the keyboard 205 or the pointing device 206, and the state of the application to be described below according to the exemplary embodiment. A network interface (I/F) 208 connects the information processing apparatus 101 to a network (a local area network, the Internet, etc.). The information processing apparatus 101 transmits and receives various information to and from other apparatuses on the network by using the network I/F 208.

Figure 2B:
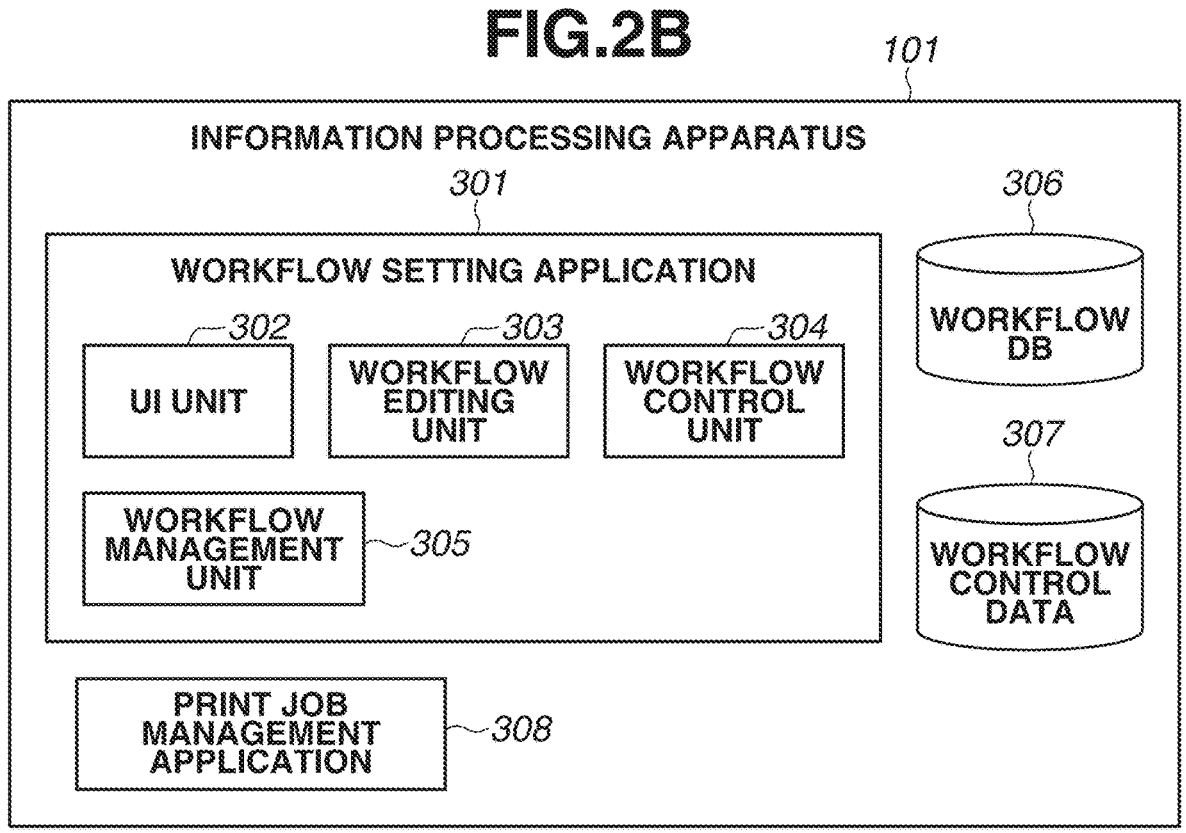
FIG. 2B is a software configuration diagram illustrating the information processing apparatus according to the first exemplary embodiment.

FIG. 2B is a software configuration diagram illustrating the information processing apparatus 101. A workflow setting application 301 is a program module that is operated after being installed in the information processing apparatus 101. In the case of executing the workflow setting application 301, the workflow setting application 301 is loaded into the RAM 203, and is then executed by the CPU 201. A user interface (UI) unit 302 generates a graphical user interface (GUI), which is described below, or receives various input operations from a user and instructs to execute processing corresponding to the received input operations. A workflow editing unit 303 executes various editing processes (workflow creation, editing, registration, etc.) for the workflow setting application 301. A workflow control unit 304 accesses workflow control data to be described below, and executes various control operations for editing a workflow. A workflow management unit 305 accesses a workflow database (DB) 306, which is described below, registers the workflow created by the workflow setting application 301, and refers to information about the registered workflow. The workflow DB 306 is a database that manages workflow information to be described below. The workflow DB 306 is configured to store information in the HDD 204 of the information processing apparatus 101, and may also be configured to store information in another information processing apparatus (such as a database server) connected via a network. Workflow control data 307 is control data used to create a workflow as described below. A print job management application 308 is a program module that is operated after being installed into the information processing apparatus 101. The print job management application 308 receives an order for producing a product from the user through an order system (not illustrated), acquires the workflow information registered by the workflow setting application 301 from the workflow DB 306, and generates a print job corresponding to the order. Further, the print job management application 308 transmits the generated print job to each of the predetermined image forming apparatus 102 and the post-processing apparatus 103. The print job management application 308 and the workflow setting application 301 may be configured as one application. Alternatively, the print job management application 308 and the workflow setting application 301 may be configured to be installed in different information processing apparatuses 101, respectively. A workflow setting application includes a preview display function with which a print workflow is generated, setting contents of "prepress", "press", and "postpress" are reflected in the print workflow, and a preview is displayed using dummy data preliminarily defined in the system as page data.

Figure 4:
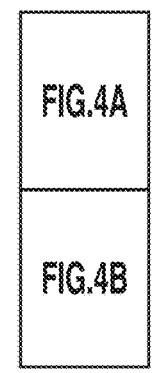
FIG. 4 is a diagram including the flowcharts of FIGS. 4A and 4B illustrating workflow creation processing according to the first exemplary embodiment.
Figure 4A:
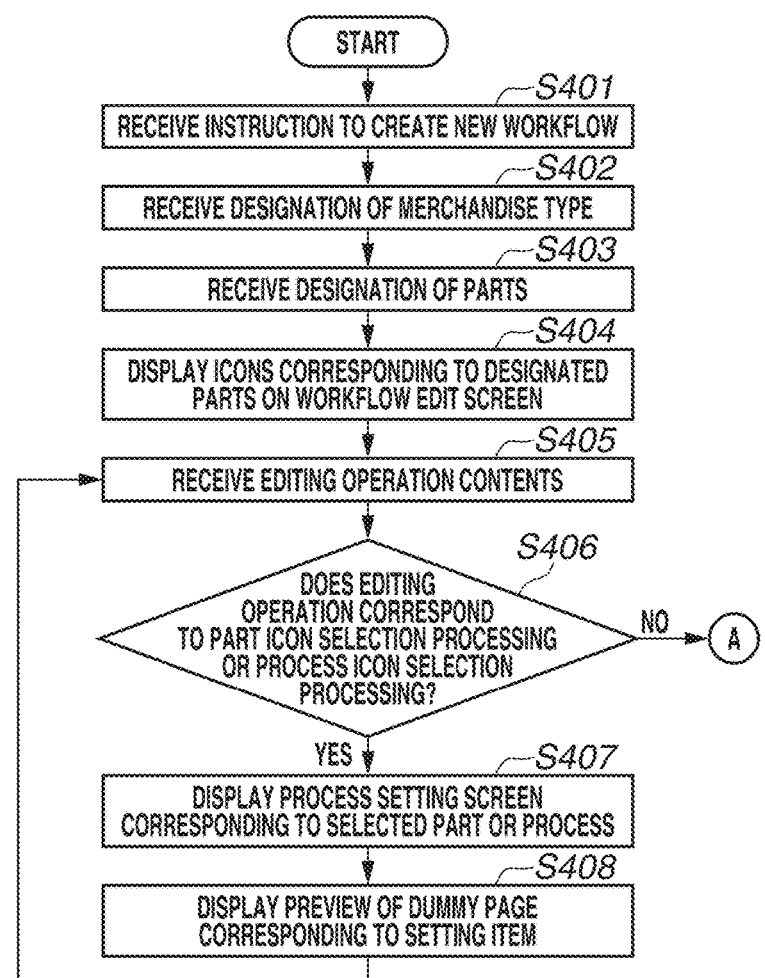
Figure 4B:
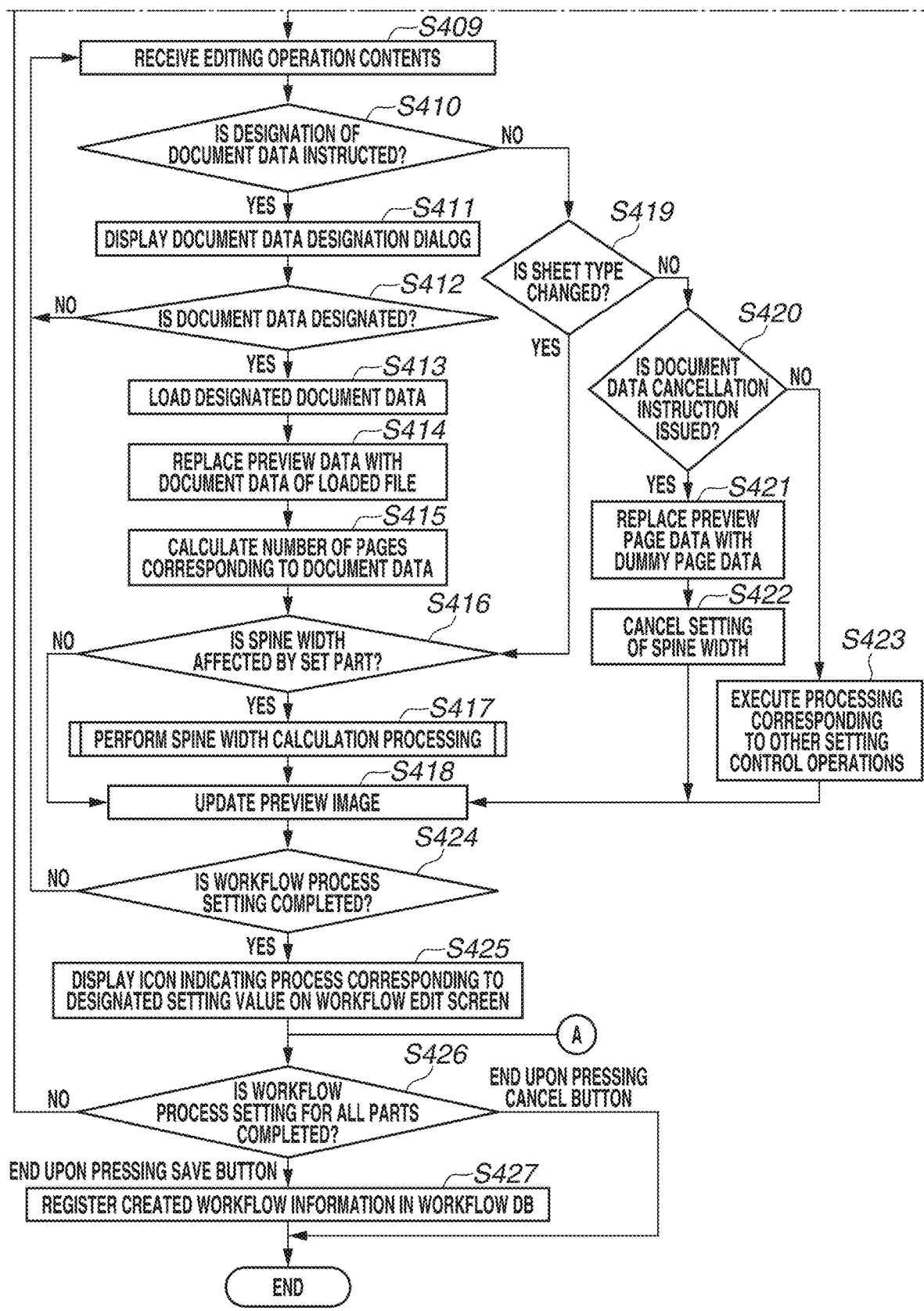

FIG. 4 is a diagram including the flowcharts of FIGS. 4A and 4B illustrating workflow setting and registration processing to be performed by the workflow setting application 301. Each processing procedure will be described with reference to UI screens for the workflow setting application 301 illustrated in FIGS. 5A and 5B, FIGS. 7A and 7B, FIGS. 8A, 8B, and 8C, FIG. 9, and FIGS. 11A and 11B, a spine width information table illustrated in FIG. 10, a workflow information table illustrated in FIG. 12, a front cover information table and a body information table illustrated in FIGS. 13A and 13B, and a title page information table and a book band information table illustrated in FIGS. 14A and 14B.

In step S401, the workflow setting application 301 receives an instruction to perform new workflow creation processing, and displays a create new screen. FIG. 5A illustrates an example of a workflow management screen for the workflow setting application 301. If the user issues an instruction to execute a workflow setting application execution file, the workflow setting application 301 is loaded into the RAM 203 and the UI unit 302 displays the workflow management screen on the display 207. The workflow management screen includes a create new button 501, an edit button 502, a delete button 503, and a workflow list 504. In the workflow list 504, the workflow information registered in the workflow DB 306 is displayed as a list. If the UI unit 302 receives information indicating that the create new button 501 is pressed by the user using the keyboard 205 or the pointing device 206, the UI unit 302 sends information indicating that new workflow creation processing has been executed to the workflow editing unit 303. Then, the workflow editing unit 303 displays the create new screen on the display 207 via the UI unit 302.

In the present exemplary embodiment, a workflow (print workflow) is created not for each piece of order data, but for a plurality of pieces of order data, and the created workflow is used. For example, a workflow is generated for each product type. Examples of the product type (merchandise) include oddments (such as a business card and a leaflet) and books (saddle stich binding and perfect binding). Examples of parts (components) of a product include a body, a front cover, a title page, a jacket, and a book band. A workflow (print workflow) is a combination of a plurality of work processes for producing a product (merchandise), and includes information about an order of work processes and a parameter for each work process. A work process includes "prepress" (imposition of content data, addition of a register mark, and barcoding), "press" (print processing performed by an image forming apparatus), and "postpress" (post-processing performed by a post-processing apparatus). A parameter for each work process is a setting value for each process. Not only print settings, but also parameter settings for "prepress" and "postpress" (e.g., pre-processing settings to be made before printing, such as barcoding, folding, and cutting, and post-processing settings to be made after printing) are also included.

In step S402, the workflow setting application 301 receives a designation of a merchandise type on the create new screen. FIG. 5B illustrates an example of the create new screen for the workflow setting application 301. The create new screen includes control areas for setting a name 601, a merchandise type 602, and parts 603. The create new screen also includes an OK button 604 for executing new workflow creation processing with set contents, and a cancel button 605 for cancelling the new workflow creation processing. The name 601 is a textbox for setting any name for identifying a workflow to be created. The merchandise type 602 is a list box for setting merchandise types preliminarily defined by the workflow setting application 301. For example, a list of product types, such as a book, a manual, and a business card, is defined. Each of the parts 603 is a list box for setting a part of a merchandise. This will be described in detail below. Upon receiving the designation of the merchandise type 602 from the user using the keyboard 205 or the pointing device 206, the UI unit 302 sets the designated merchandise type. Then, the processing proceeds to step S403.

In step S403, the workflow setting application 301 receives a designation of parts on the create new screen. Each of the parts 603 is a list box for setting components, such as a front cover, a body, a title page, and a book band, for a merchandise, and enables setting of a plurality of parts depending on the merchandise to be produced. FIG. 5B illustrates a state where four parts, i.e., a front cover, a body, a title page, and a book band, are set. Upon receiving the designation of the parts 603 from the user using the keyboard 205 or the pointing device 206, the UI unit 302 sets the designated parts. Then, when information indicating that the OK button 604 is pressed is received, the processing proceeds to step S404.

Figure 7A:
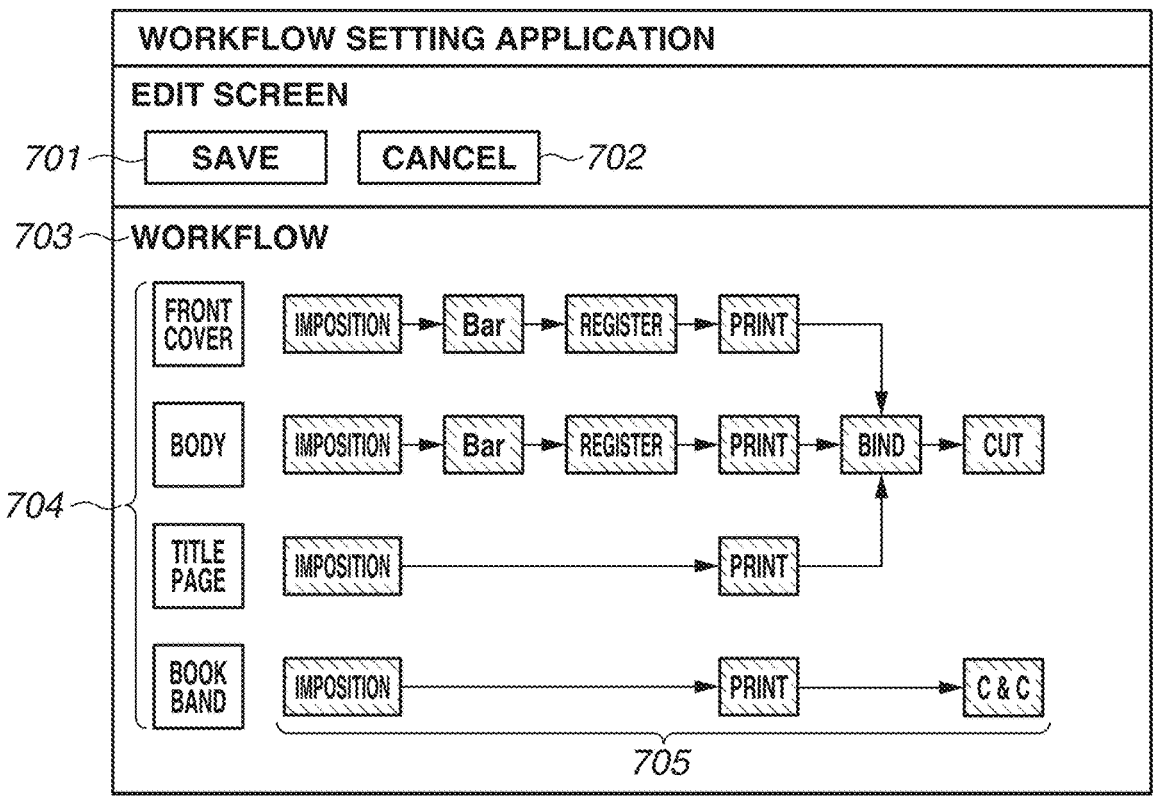
FIGS. 7A and 7B are diagrams each illustrating an example of a workflow edit screen for the workflow setting application.
Figure 7B:
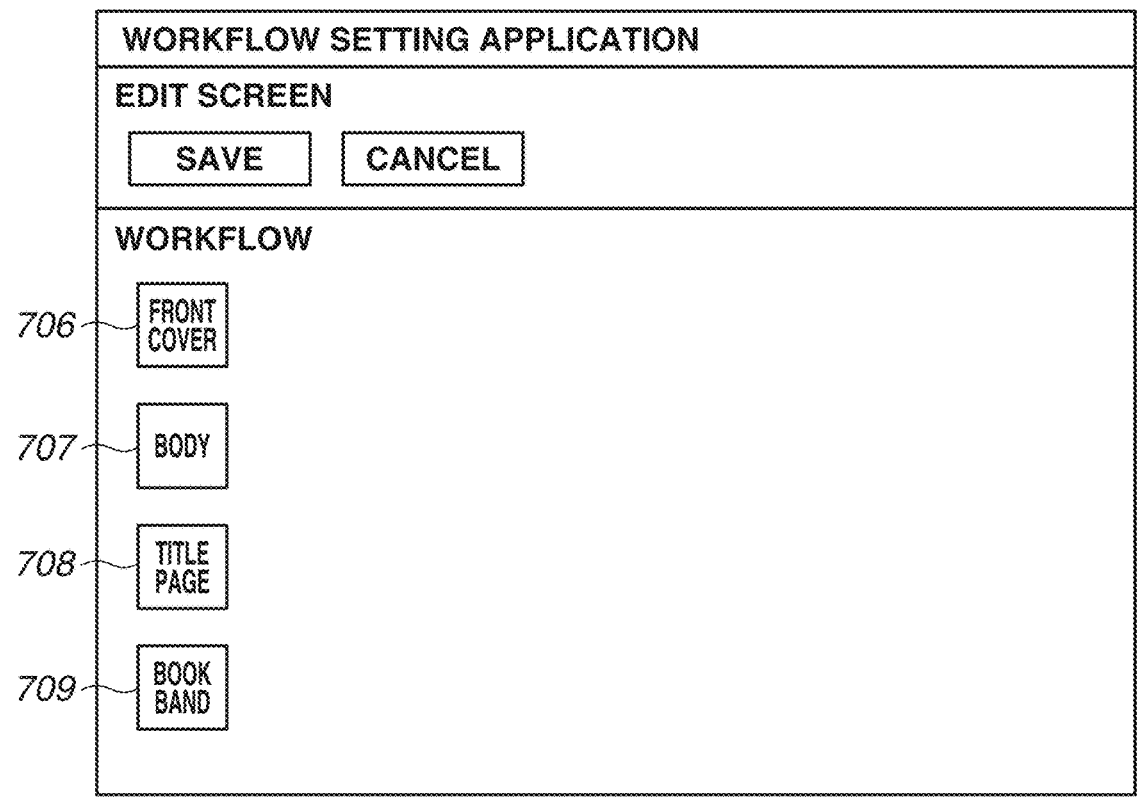

In step S404, icon images each corresponding to a different one of the parts set in step S403 are displayed on a workflow edit screen. FIG. 7A illustrates an example of the workflow edit screen. The workflow edit screen includes a save button 701 for saving the edited workflow in the workflow DB 306, and a cancel button 702 for cancelling the edited workflow contents. A workflow area 703 indicates an area for displaying the edited workflow. In the workflow area 703, part icons 704 each indicating a different one of the set parts and process icons 705, connected each other, indicating a workflow for the corresponding part are displayed. Among the process icons 705, "Imposition" indicating an imposition process, "Bar" indicating a barcoding process, "Register" indicating a register mark process, "Print" indicating a print process, "Bind" indicating a perfect binding process, "Cut" indicating a three-side cutting process, and "C & C" indicating a cut and crease process are displayed in a connected manner. In step S404, the icon images each corresponding to a different one of the parts set in step S403 are displayed in the workflow area 703 via the UI unit 302. For example, in the case of setting a front cover part, a body part, a title page part, and a book band part, four icon images respectively corresponding to the set parts are displayed. FIG. 7B illustrates an example of the workflow edit screen in a state where a new workflow is created on the create new screen. At a point when a new workflow is created, only icons (a front cover icon 706, a body icon 707, a title page icon 708, and a book band icon 709) respectively corresponding to the parts are displayed.

In step S405, an editing operation on the workflow edit screen is received. The UI unit 302 receives various editing operations when at least one of editing control icons, such as the part icons 704, the process icons 705, the save button 701, and the cancel button 702, is clicked by the user using the pointing device 206.

In step S406, it is determined whether the editing operation received in step S405 corresponds to part icon selection processing or process icon selection processing. In a case where the process UI unit 302 receives processing corresponding to any one of the part icons 704 clicked by the user, or receives processing corresponding to any one of the process icons 705 clicked by the user, it is determined that the editing operation corresponds to part icon selection processing or process icon selection processing (YES in step S406), and then the processing proceeds to step S407. In the other cases (NO in step S406), the processing proceeds to step S426.

In step S407, a workflow process setting screen corresponding to the part or process selected in step S406 is displayed. FIG. 8A illustrates an example of the workflow process setting screen. A user operation is received via the workflow process setting screen illustrated in FIG. 8A (user operation reception). The workflow process setting screen includes a process icon 801 representing a workflow set for a part to be set, and icons 802 to 807 that are displayed in the order of work processes of the workflow. The icon 802 indicates that the imposition process is set. The icon 803 indicates that the barcoding process is set. The icon 804 indicates that the register mark process is set. The icon 805 indicates that the print process is set. The icon 806 indicates that the perfect binding process is set. The icon 807 indicates that the three-side cutting process is set. A label control icon 808 indicates a part to be set. A tab control button 809 is used to set processes in prepress, press, and postpress categories. For example, when a prepress tab is selected, various setting control operations for setting the process in the prepress category are displayed. Process setting buttons 810 are used to set various processes. When the prepress tab is displayed, process setting buttons indicating "barcode", "text", "image", "register mark", and "mark", respectively, which can be set in the press category, are displayed. Detailed setting control areas 811, 812, and 813 are each used to set details of each process. The detailed setting control areas 811, 812, and 813 indicate detailed setting control operations for setting the imposition process (811), the barcoding process (812), and the register mark process (813), respectively. For example, in the imposition process, control operations for setting an output sheet size, a finished size, and the like are displayed. A process delete button 814 enables the user to cancel the set process. In a preview area 815, a preview of a printed material in which setting values set in each setting control operation are reflected is displayed. The workflow process setting screen also includes a barcode layout image 816, a register mark layout image 817, and dummy page data 818. The dummy page data 818 does not indicate document data of order data, but indicates page data to be displayed in default. As the case illustrated in FIG. 8A, data on a blank sheet on which a page number is added is used as the dummy page data 818. The page data is data including a predetermined number of pages. The workflow process setting screen also includes a sheet number 819 that is displayed in the preview area 815, a page movement button 820 for changing the sheet number to be displayed in the preview area 815, and a document data designation button 821 for displaying a preview by designating document data and replacing the dummy page data 818 with the designated document data. Unless the document data designation button 821 is selected, the dummy page data 818 is displayed. A save button 822 is used to save set contents set on the workflow process setting screen and then return to the workflow edit screen. A cancel button 823 is used to discard the set contents and then return to the workflow edit screen. In step S407, the workflow process setting screen corresponding to the part selected in step S405 is displayed on the display 207 via the UI unit 302. For example, when the "front cover" part is selected, the workflow process setting screen for setting the "front cover" process is displayed. No process is set in a state where a new part is created. Accordingly, in an initial state of the workflow process setting screen, the workflow process setting screen may be displayed in a state where each process is not set (the process icon 801 is blank), or in a state where a prescribed value is set for, for example, the icon 802 indicating the imposition process as an essential process in the system. Applied setting values are temporarily stored in the RAM 203.

If not a part but a process is selected in step S405, the workflow process setting screen is displayed in a state where the selected process is edited. For example, if the icon corresponding to the imposition process for the body part is selected, the workflow process setting screen for editing the body part is displayed in a state where a setting control operation for the imposition process in the prepress tab can be performed. This processing enables direct access to a workflow setting screen for editing processes from the workflow edit screen during the workflow editing operation in a state where a plurality of processes is already set.

Figure 8B:
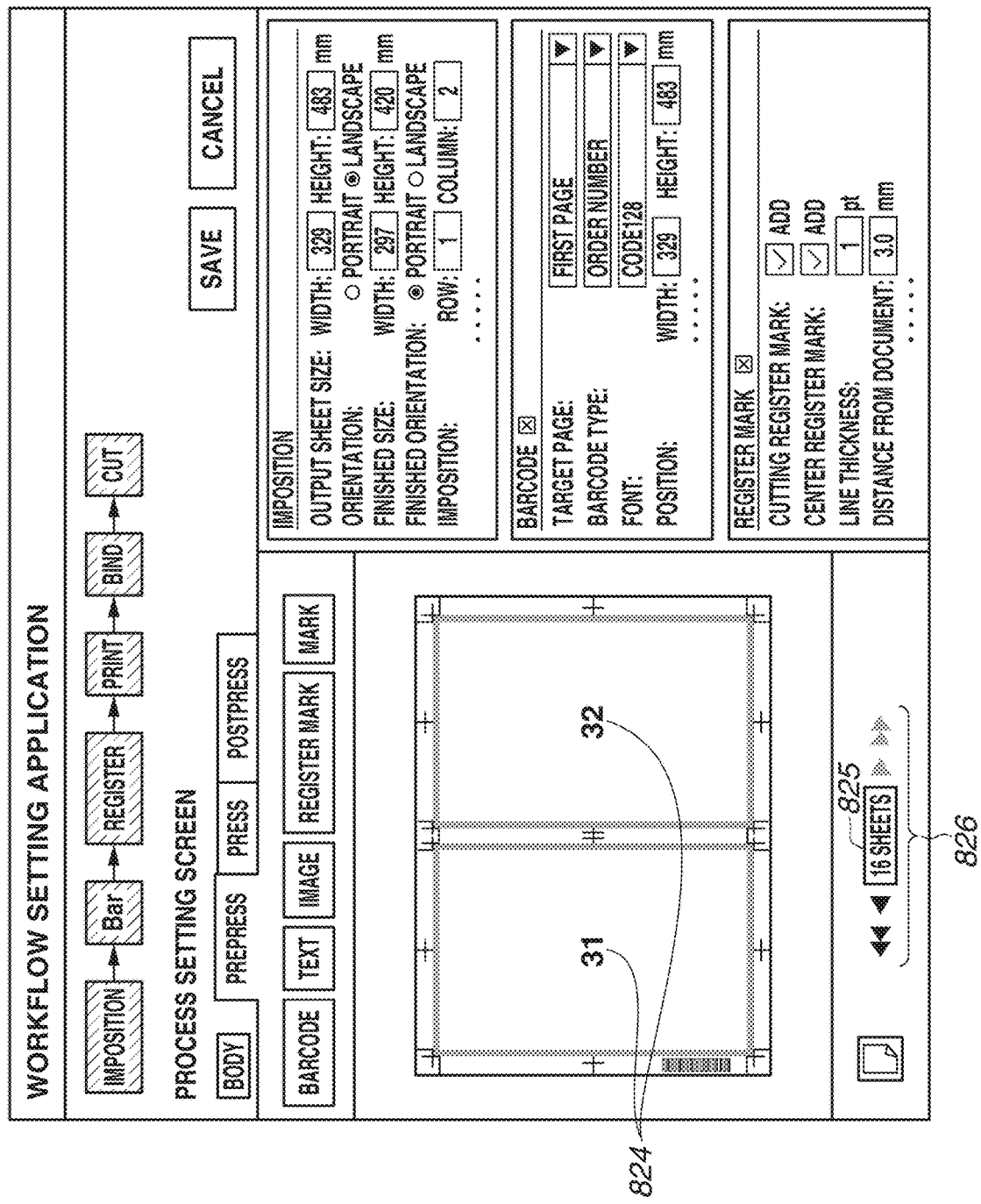

In step S408, the workflow editing unit 303 displays a preview using dummy page data corresponding to the contents set in the preview area 815. The workflow editing unit 303 accesses dummy page data preliminarily held in the workflow setting application 301, creates preview data by laying out the dummy page data according to setting values for each process, and displays the created preview data in the preview area 815. The dummy page data may be stored and held in the HDD 204 as data to be held in the workflow setting application 301, or may be dynamically generated by a program. The number of pages that can be displayed in the preview area 815 is controlled depending on the number of pages of the dummy page data. For example, when the number of pages of the dummy page data is 32, up to 32 sheets can be displayed for one-page imposition and up to eight sheets can be displayed for four-page imposition. FIG. 8B illustrates a state where a preview of a last sheet is displayed when the number of dummy pages is 32. In the preview area 815, 31st and 32nd pages (824) to be laid out on the last sheet are displayed, and "16 sheets" (825) is displayed as the number of sheets. A sheet movement button 826 is used to control the display of sheets such that the sheets are prevented from moving even when a button for moving to the next page is disabled or pressed. When the dummy page data is dynamically generated by a program, the number of pages that can be displayed may be controlled by limiting the number of sheets. For example, when an upper limit of the number of sheets that can be displayed is six, up to six pages can be displayed for one-page imposition and up to 24 pages can be displayed for four-page imposition.

In step S409, various editing operations are received from the user on the workflow process setting screen. The UI unit 302 receives various editing operations when any one of the editing control buttons illustrated in FIG. 8A is selected or clicked by the user using the pointing device 206. Examples of the editing control buttons illustrated in FIG. 8A include the tab control button 809, the process setting buttons 810, the process delete button 814, the detailed setting control areas (811, 812, and 813), the document data designation button 821, the save button 822, and the cancel button 823.

In step S410, it is determined whether the received editing operation corresponds to setting of document data. Upon receiving, from the UI unit 302, information indicating that the document data designation button 821 is pressed, the workflow editing unit 303 determines that the editing operation corresponds to setting of document data (YES in step S410), and then the processing proceeds to step S411. In the other cases (NO in step S410), the processing proceeds to step S419.

Figure 9:
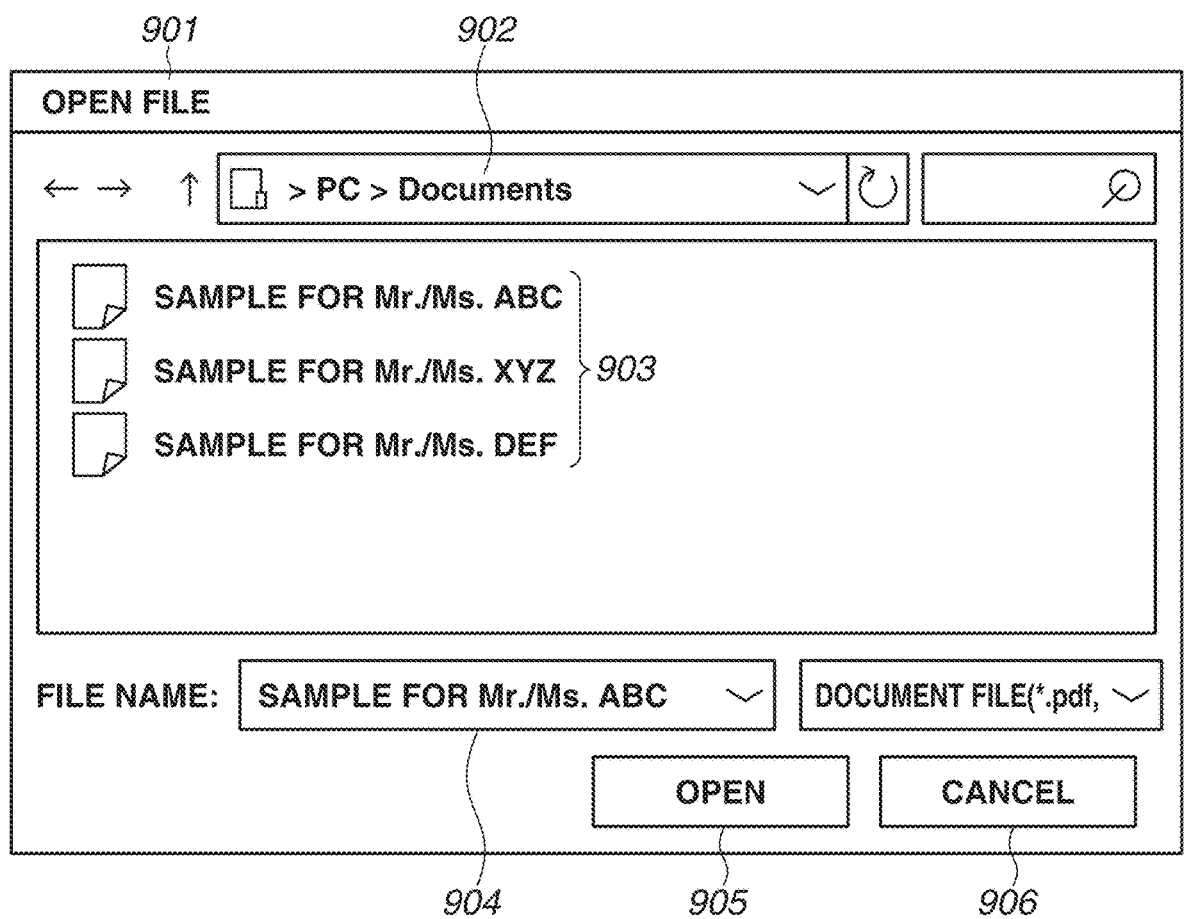
FIG. 9 is a diagram illustrating an example of a document data selection screen.

In step S411, a document data designation dialog is displayed. Upon receiving information indicating that the document data designation button 821 is pressed in step S410, the workflow editing unit 303 displays the document data designation dialog on the display 207 via the UI unit 302. FIG. 9 illustrates an example of the document data designation dialog. The document data designation dialog displays a list of data stored by accessing the HDD 204 or a file server (not illustrated) connected via the network 100. The document data designation dialog includes a document data designation dialog 901, a data path 902 indicating a storage destination of accessed data, document data 903 that is stored in the storage destination designated by the data path 902, a file name 904 indicating the file name of designated document data, an open button 905 that is used to determine the document data designated by the file name 904 to be data to be opened, and a cancel button 906. In the example illustrated in FIG. 9, portable document format (PDF) data is used as the document data, but data of other formats, such as Tagged Image File Format (TIFF), may be used as long as the data can be loaded into the system.

In step S412, it is determined whether document data is designated. In a case where the UI unit 302 receives information indicating that any document data is designated and the open button 905 is pressed in the document data designation dialog 901, the workflow editing unit 303 determines that document data is designated (YES in step S412), and then the processing proceeds to step S413. Meanwhile, in a case where the UI unit 302 receives information indicating that the cancel button 906 is pressed (NO in step S412), the processing returns to step S409.

In step S413, the document data designated in step S412 is loaded. The workflow editing unit 303 accesses the designated document data and loads the document data into the RAM 203.

In step S414, the workflow editing unit 303 replaces dummy page data with the document data loaded in the memory as preview page data.

In step S415, the number of pages displayed in the preview area 815 is calculated based on the number of pages of the document data loaded in step S413. The workflow editing unit 303 calculates the number of pages that can be displayed in the preview area 815 based on the number of pages of the loaded document data and setting contents. For example, when the number of pages of the document data is 12 and 2-page imposition is carried out, the number of pages that can be displayed is six.

In step S416, it is determined whether the spine width is affected by the part set in the previous processing step. The workflow editing unit 303 accesses a spine width information table in the workflow control data 307 via the workflow control unit 304, and determines whether the spine width is affected by the set part. FIG. 10 illustrates an example of the spine width information table. The spine width information table stores information indicating whether the spine width is affected by each part and information about the order of combining parts. The spine width information table also stores information indicating whether the spine width is affected by each part when document data is set, or when a sheet type is set. Setting of the sheet type will be described below. For example, as for the front cover part, the spine width is affected not when document data is set, but when the sheet type is set. Meanwhile, as for the body part, the spine width is affected when document data is set, as well as when the sheet type is set. The combining order defines the order of parts to be combined. The combining order indicates that the parts are combined in ascending order of the value of the combining order (in the order of "body", "title page", "front cover", "jacket", and "book band", in which "body" is located on the innermost side). The workflow editing unit 303 accesses the spine width information table via the workflow control unit 304, and determines whether the spine width is changed with the set part. In a case where the spine width is affected by the set part (YES in step S416), the processing proceeds to step S417. In a case where the spine width is not affected by the set part (NO in step S416), the processing proceeds to step S418.

In step S417, the workflow editing unit 303 calculates the spine width. The spine width calculation processing will be described below.

Figure 11A:
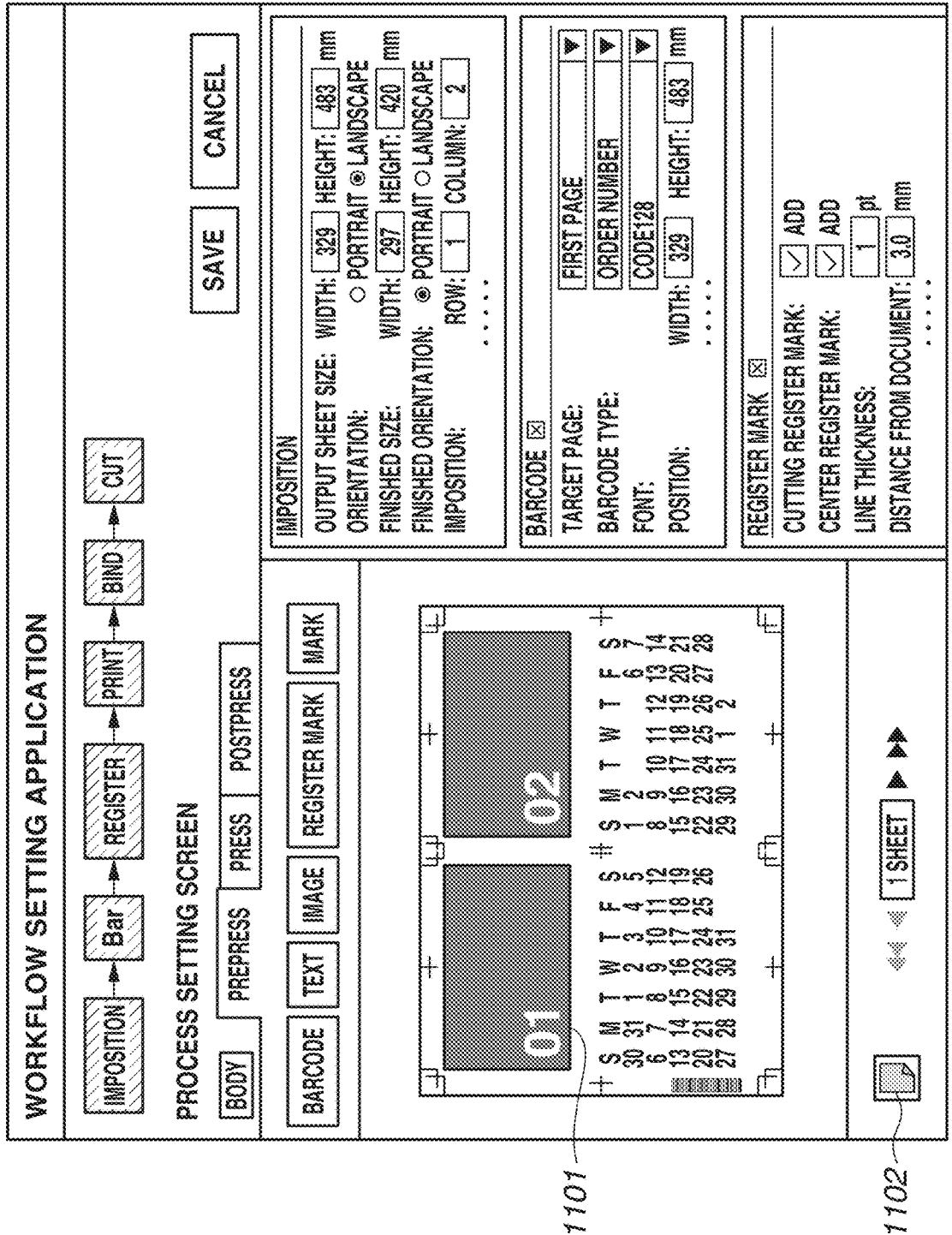
FIGS. 11A and 11B are diagrams each illustrating an example of the workflow process setting screen for the workflow setting application.
Figure 11B:
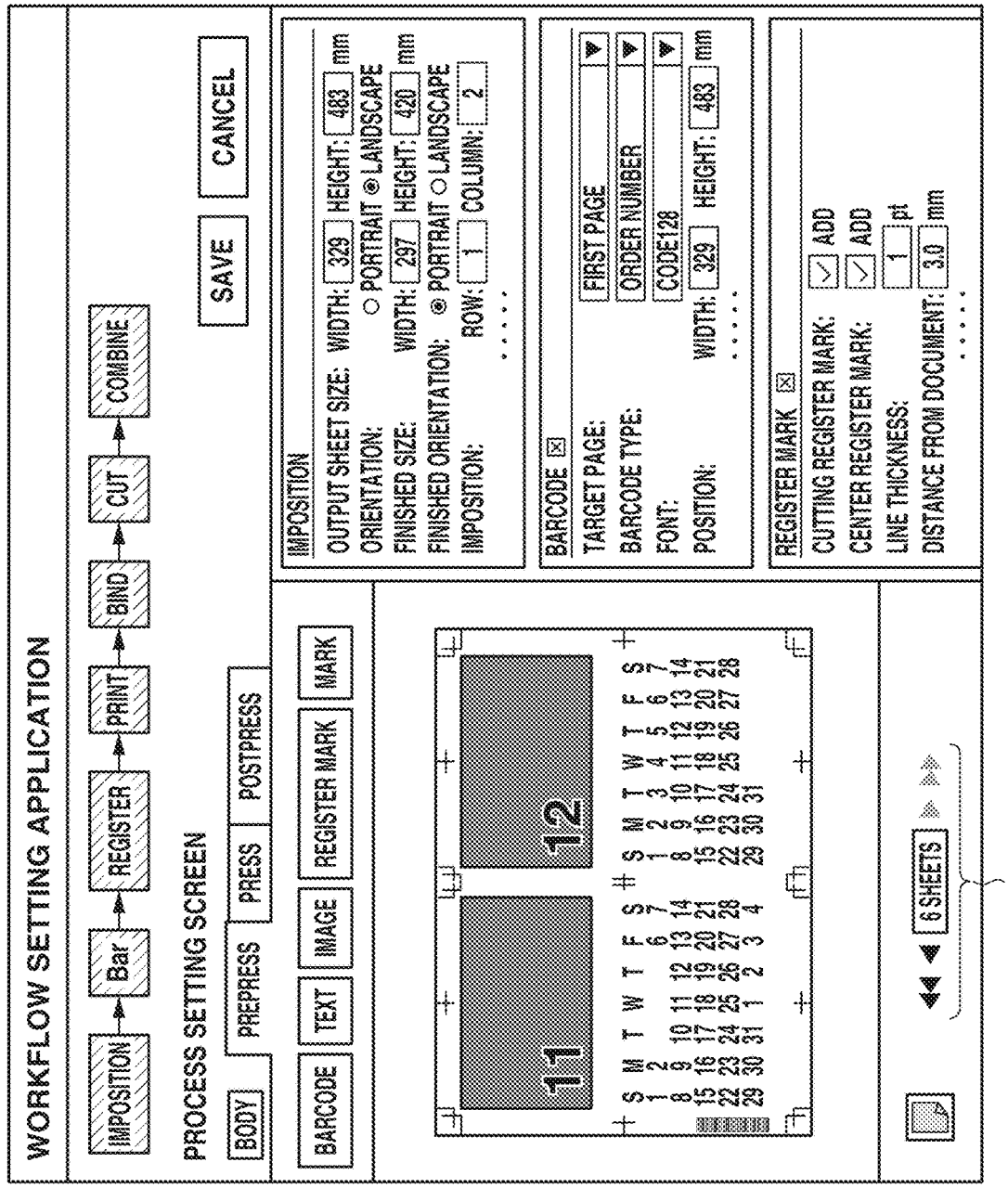

In step S418, the image of the printed material displayed in the preview area 815 is updated based on the settings. When preview document data is designated, the document data replaced as the preview page data in step S414 is displayed in the preview area 815. FIG. 11A illustrates an example where a preview of document data is displayed in the preview area 815. A dummy page is replaced with page data 1101 of document data and the page data 1101 is displayed. A document data setting button 1102 indicates that document data is already set. FIG. 11B illustrates the preview area 815 in a state where the sixth sheet is displayed when two-page imposition of 12-page document data is carried out. Based on the number of pages calculated in step S415, the page movement button 820 is controlled to prevent the movement to the sixth and subsequent pages (1103). Further, the preview is updated based on the setting value adjusted depending on the spine width calculated in step S417. The preview processing according to the spine width will be described below.

In step S419, it is determined whether the editing operation received in step S409 corresponds to changing the sheet type. FIG. 8C illustrates an example of the workflow process setting screen to change the sheet type. FIG. 8C illustrates an example where a control area (829) for setting the sheet type is disposed in a detailed setting control area (828) corresponding to the print setting in a press tab (827). Upon receiving a setting change in the sheet type setting control area 829, the UI unit 302 determines that the sheet type is changed (YES in step S419), and then the processing returns to step S416. In the other cases (NO in step S419), the processing proceeds to step S420.

In step S420, it is determined whether the editing operation received in step S409 corresponds to cancellation of document data. Upon receiving, from the UI unit 302, information indicating that the document data setting button 1102, which indicates that document data is already set, is pressed, workflow editing unit 303 determines that the editing operation corresponds to cancellation of document data, and then the processing proceeds to step S421. In the other cases, the processing proceeds to step S423.

In step S421, the workflow editing unit 303 replaces the document data with dummy page data as preview page data.

In step S422, the setting of the spine width is cancelled. The processing of cancelling the setting of the spine width will be described below.

In step S423, processing is executed in response to various instructions received in step S409. For example, if information indicating that the press tab in the tab control button 809 is pressed is received, processing for switching to a screen display for setting a workflow in the press category is executed. In another example, if information indicating that a barcode button on the process setting button 810 is pressed is received, processing for adding the barcoding process is executed.

In step S424, it is determined whether the workflow process setting corresponding to the part is completed. Upon receiving information indicating that the save button 822 or the cancel button 823 is pressed by the user via the UI unit 302, the workflow editing unit 303 determines that the workflow process setting is completed. In a case where it is determined that the workflow process setting is completed (YES in step S424), the processing proceeds to step S425. In the other cases (NO in step S424), for example, in a case where another editing operation is received and a workflow process is continuously set, the processing returns to step S409. The user sets the prepress, press, and postpress processes for the part. After the input of all setting values for required processes is completed, the save button 822 is pressed to complete the setting. When the save button 822 is pressed, the setting values set on the workflow process setting screen at the point of the save button 822 pressing time are determined and then the processing proceeds to the subsequent processing. Meanwhile, when the cancel button 823 is pressed, the setting contents set in steps S409 to S423 are discarded and then the processing proceeds to the subsequent processing. In a case where it is determined that the workflow process setting is completed, the UI unit 302 does not display the workflow process setting screen and displays the workflow edit screen.

In step S425, a process icon indicating a workflow process is displayed in an area for a target part depending on the workflow setting made in step S424. The workflow editing unit 303 acquires, from the RAM 203, the setting for the workflow process corresponding to the target part, and displays the process icon indicating the workflow setting on the workflow edit screen via the UI unit 302.

In step S426, it is determined whether the workflow process setting for all parts is completed. Upon receiving information indicating that the save button 701 or the cancel button 702 is pressed by the user via the UI unit 302, the workflow editing unit 303 determines that the workflow editing operation is completed. In a case where the operation ends upon pressing the save button 701, the processing proceeds to step S427. In a case where the operation ends upon pressing the cancel button 702, the processing of the flowchart is terminated. In a case where a workflow for each part is continuously set (NO in step S426), the processing returns to step S405. After completion of setting of required workflow processes for all parts, such as the front cover, the body, the title page, and the book band, the user presses the save button 701 to complete the setting. When the save button 701 is pressed, workflow editing contents are determined and then the processing proceeds to the subsequent processing. Meanwhile, when the cancel button 702 is pressed, the workflow editing contents are discarded and then the processing of the flowchart is terminated.

In step S427, the setting contents for the set workflow process are stored as workflow information in the workflow DB 306. FIG. 12 illustrates an example of the workflow information table. FIGS. 13A and 13B and FIGS. 14A and 14B each illustrate an example of an information table for each part to be referred to from the workflow information table. Workflow information is managed by these two types of information tables. The workflow information table illustrated in FIG. 12 stores information about an identification (ID) for uniquely identifying each workflow, and information about a name, a merchandise type, and parts set on the create new screen described above. As for the parts, an ID for uniquely identifying each part is stored for each set part. The ID for uniquely identifying each workflow and the ID for uniquely identifying each part are automatically set by the system. FIG. 13A illustrates an information table for the front cover part. FIG. 13B illustrates an information table for the body part. FIG. 14A illustrates an information table for the title page part. FIG. 14B illustrates an information table for the book band part. The information tables for the respective parts store an ID corresponding to a part ID in the workflow information table illustrated in FIG. 12 and a setting value for each process to be set on the workflow process setting screens illustrated in FIGS. 8A, 8B, and 8C described above. For example, Part 2 ID "001-B001" of Part 2 "body" in a workflow (name "XXX manual") with an ID "001" illustrated in FIG. 12 is associated with the ID "001-B001" in the body part information table illustrated in FIG. 13B. Further, setting values for each process of Part 2 "body" (e.g., a sheet width of 224 and a sheet height of 335 for the imposition process in the prepress category) are stored. In step S427, the workflow editing unit 303 converts the workflow setting values, which are temporarily stored in the RAM 203, into formats illustrated in FIG. 12, FIGS. 13A and 13B, and FIGS. 14A and 14B via the workflow management unit 305, and stores the converted data as workflow information in the workflow DB 306. An order system that inputs an order to the print job management application 308 preliminarily defines order contents and the ID for uniquely identifying each workflow illustrated in FIG. 12 in such a manner that the order contents and the ID are associated with each other. With this configuration, a print job corresponding to an order received in the order system can be generated based on the workflow setting made by the workflow setting application 301.

Figure 3:
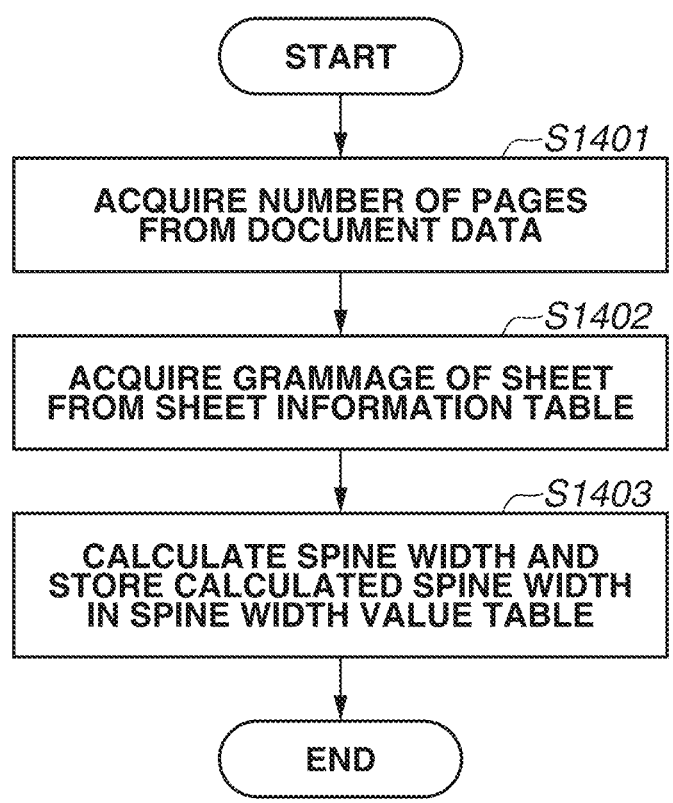
FIG. 3 is a flowchart illustrating spine width calculation processing.

FIG. 3 is a flowchart illustrating details of the spine width calculation processing in step S417. Each processing step will be described below.

In step S1401, the workflow editing unit 303 acquires the number of pages from the document data loaded in step S413.

In step S1402, the workflow editing unit 303 acquires information about a grammage of a set sheet type from a sheet information table stored in the workflow control data 307. FIG. 15 illustrates an example of the sheet information table. Information about the grammage, surface property, color, and the like is defined for each sheet type. For example, the grammage of coated paper is 170 g/m$^2$.

In step S1403, the workflow editing unit 303 calculates the spine width based on the number of pages acquired in step S1401 and the grammage of the sheet type acquired in step S1402, and stores the calculated spine width in a spine width value table. For example, when the number of pages is 50 and the grammage is 170 g/m$^2$, the spine width is calculated by the following expression: 50×(170/850)=10 (mm). The value "850" in this expression is a coefficient used for calculating a thickness (mm) based on the grammage. This value is not particularly limited as long as the value can be used to attain the same purpose. Instead of storing the grammage, information about the thickness (mm) of a sheet may be stored in the above-described sheet information table and the spine width may be calculated based on the value of the thickness. FIG. 16 illustrates an example of the spine width value table. The spine width value table stores information about the spine width of each part. For example, when the spine width of the body part is calculated, the calculated spine width is stored as the spine width of the body. In the processing of cancelling the setting of the spine width in step S422 described above, the value of the spine width in the spine width value table set in this processing step is deleted.

The processing of updating the preview in step S418 based on the spine width calculated in step S417 will be described.

Figure 17A:
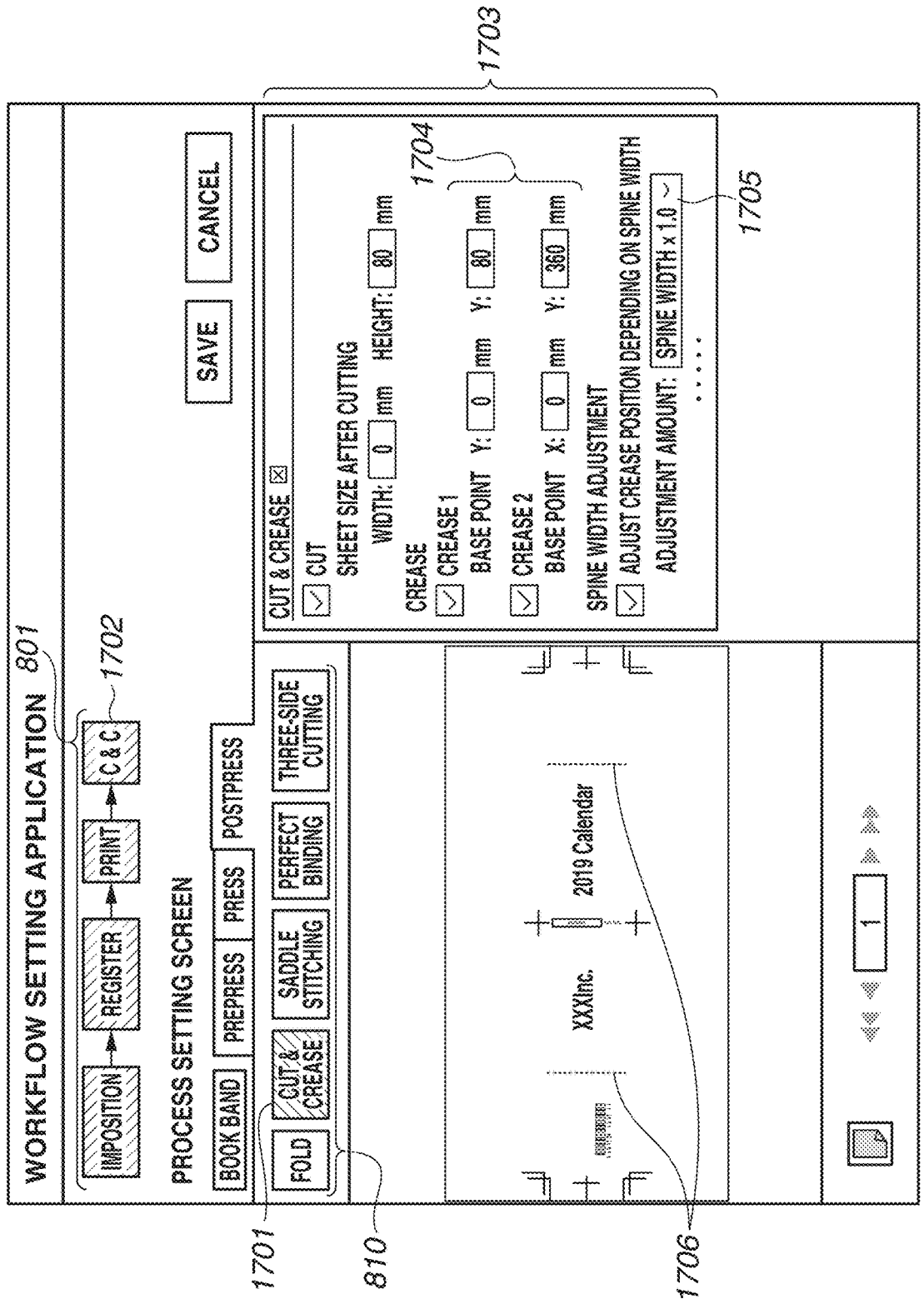
FIGS. 17A and 17B are diagrams each illustrating an example of the workflow process setting screen for the workflow setting application.
Figure 17B:
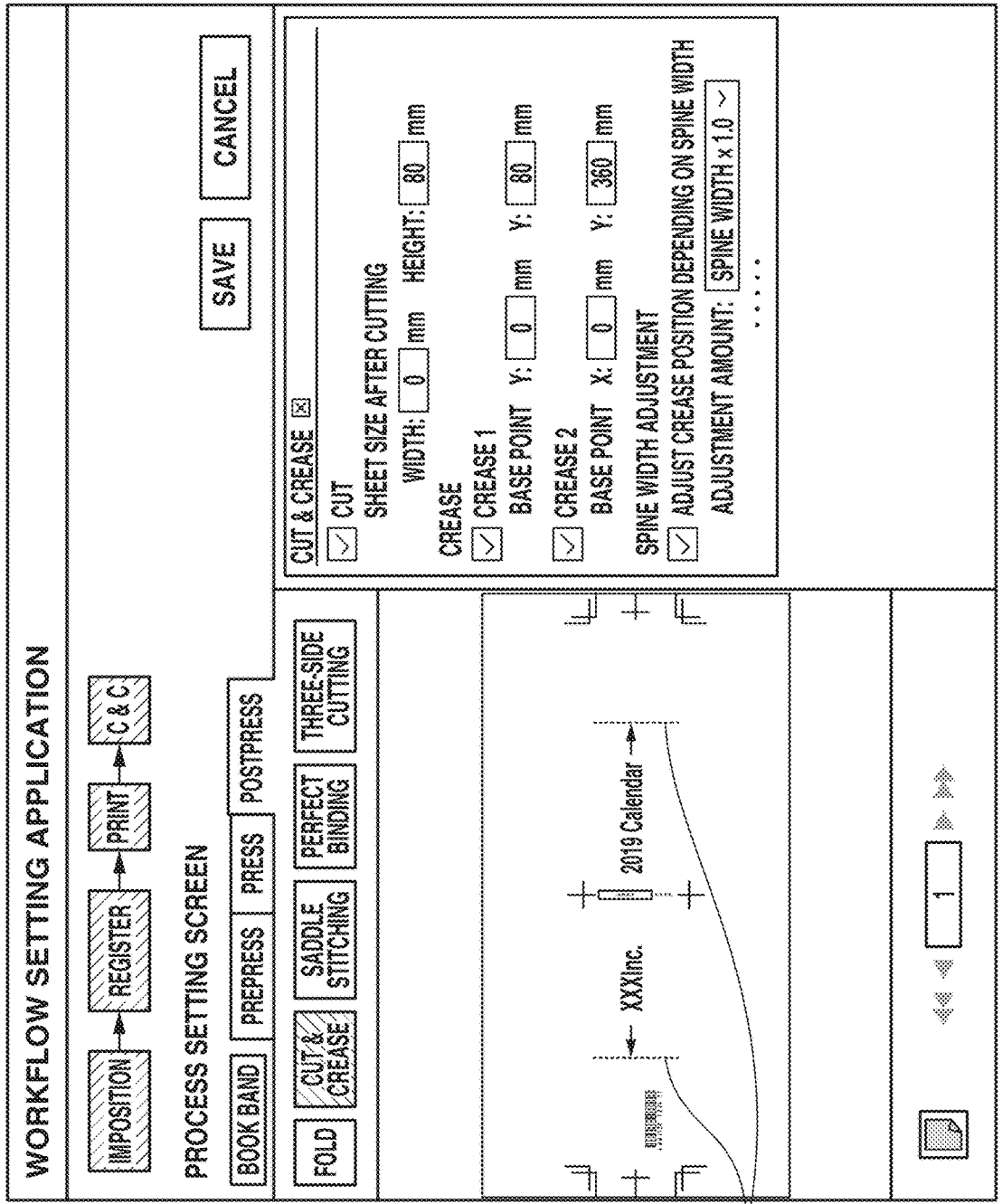

FIG. 17A illustrates an example of the workflow process setting screen for setting the postpress category for the book band part. The workflow process setting screen includes a process button 1701 for setting the cut and crease process. FIG. 17A illustrates a state where the cut and crease process is already set. The workflow process setting screen also includes process icons 1702 indicating that the cut and crease process is set in the workflow, a detailed setting control area 1703 for setting details of the cut and crease process, a setting control area 1704 for setting a crease position, a setting control area 1705 for adjusting the crease position based on the spine width, and line objects 1706 indicating the crease position set in the setting control areas 1704 and 1705 on the preview. The crease position of the book band varies based on the spine width. However, the spine width can be calculated only after the number of pages of document data to be actually laid out is determined. Accordingly, at a point when a workflow is set by a workflow editing application, the crease position is determined without taking into consideration the spine width, and the crease position is adjusted based on the value of the spine width during processing in a workflow in which an actual order is set. The workflow editing unit 303 acquires the combining order of parts from the spine width information table, acquires the value of the spine width from the spine width value table, calculates the spine width based on the parts set in the workflow, and displays a preview of the crease position adjusted based on the spine width. For example, the spine width of the book band corresponds to the sum of the spine widths of the jacket, the front cover, the title page, and the body, which are combined on the inside of the book band. Based on the calculated spine width, a preview image in which the set crease position is shifted by the amount corresponding to the spine width when the spine width is 18 mm is displayed based on the setting "spine width×1" in the setting control area 1705 for the adjustment value based on the spine width. FIG. 17B illustrates a preview image indicating the crease position adjusted by the amount corresponding to the spine width. The preview image includes objects 1707 indicating the spine width and the crease position adjusted according to the setting of the adjustment value based on the spine width. Arrow objects illustrated in FIG. 17B indicate that the crease position is shifted by the amount corresponding to the spine width. The objects are not actually displayed on the screen.

The processing described above enables the user to check a preview of actual document data in the case of setting a workflow by the workflow setting application 301. As a result, it is possible to check a preview of document data corresponding to a plurality of orders to be processed in the workflow, and it is also possible to accurately determine whether various setting values for the workflow are accurate. Furthermore, it is possible to check a preview in which the spine width is adjusted based on the number of pages of designated document data, and it is also possible to accurately determine whether setting values to be adjusted based on the spine width are accurate.

Checking of workflow settings using dummy data has the following issue.

For example, even in a case where a barcode position is set based on dummy page data, if printing is performed using actual order document data with a black border, the barcode and the black border may overlap each other, and thus a minor correction may be required for the barcode position.

The crease position (folding line position) of each part, such as a jacket and a book band, in perfect binding is variable with the length of the spine width. Accordingly, during setting of a workflow, the crease position is set using the spine width as a tentative value (e.g., 0 mm) and an adjustment value, such as "spine width×0.5 mm", is set, to adjust the crease position when an order is actually processed. In this process, when dummy page data is used, the workflow settings can be checked only on the preview corresponding to the spine width of 0 mm or the fixed spine width in the system. This makes it difficult to accurately determine whether setting values are accurate, so that the crease position may be shifted from an assumed value when order document data is printed, and a correction of the crease position and adjustment value may be required.

However, it is possible to accurately determine whether various setting values for a workflow are accurate by checking workflow settings using the actual document data. While the present exemplary embodiment illustrates an example where workflow settings are checked using the actual document data, workflow settings may be checked using document data including an image layout similar to that of the actual document data, or document data having the same number of pages as the actual document data.

As described above, workflow settings are checked using the actual document data. However, since a preview is displayed using dummy pages during setting of a workflow, a processing load on the preview display can be reduced and settings can be made without depending on specific document data.

As described above, since a preview is displayed for a single workflow by switching a plurality of pieces of document data, the user can check that a single workflow can be associated with a plurality of pieces of document data, before printing.

A second exemplary embodiment of the present disclosure will now be described. Descriptions of the same components as those of the first exemplary embodiment are omitted as needed. The second exemplary embodiment illustrates processing for designating and switching preview document data in a menu format.

Figure 18B:
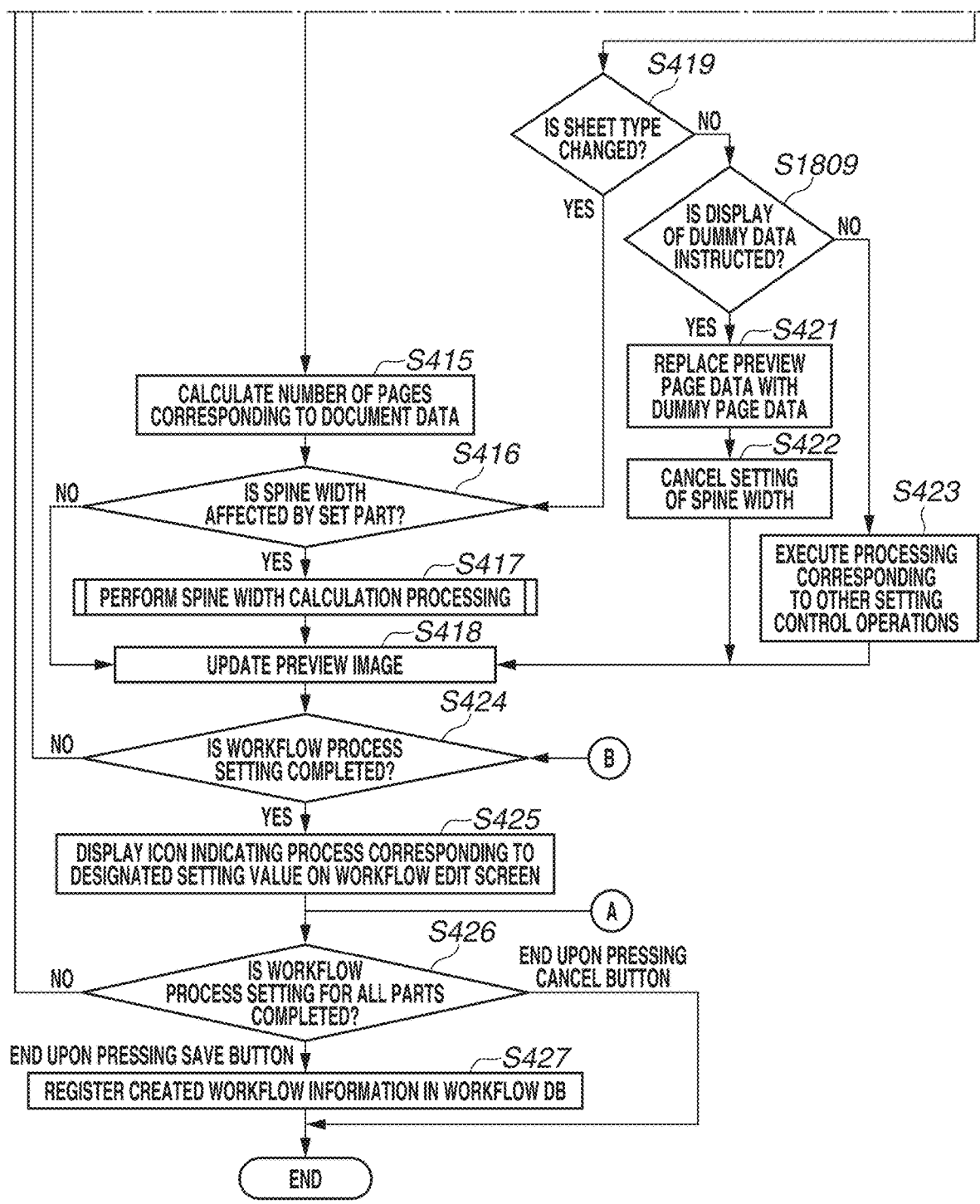
FIG. 18 is a diagram including the flowcharts of FIGS. 18A and 18B illustrating workflow creation processing according to a second exemplary embodiment of the present disclosure.

FIG. 18 is a diagram including the flowcharts of FIGS. 18A and 18B illustrating workflow setting and registration processing performed by the workflow setting application 301 according to the second exemplary embodiment. The processing will be described with reference to FIGS. 19A and 19B. The same processes as those of the first exemplary embodiment illustrated in FIG. 4 are denoted by the same step numbers, and redundant descriptions thereof are omitted as needed.

Figure 19A:
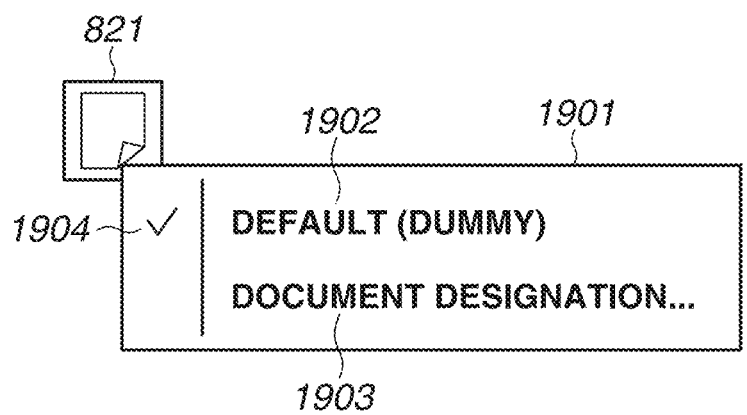
FIGS. 19A and 19B are diagrams each illustrating an example of a document data setting menu.

In step S1801, it is determined whether the received editing operation corresponds to setting of new document data. FIG. 19A illustrates an example of a document data setting menu (1901) to be displayed when the document data designation button 821 is pressed. As a display screen, the document data setting menu 1901 illustrated in FIG. 19A is displayed in the vicinity of the document data designation button 821 illustrated in FIG. 8A. The document data setting menu 1901 includes a default menu 1902 for instructing display of a dummy page, a document designation menu 1903 for designating new document data, and a check mark 1904 indicating a currently-selected menu. Upon receiving, from the UI unit 302, information indicating that the document designation menu 1903 is pressed on the document data setting menu 1901, the workflow editing unit 303 determines that the editing operation corresponds to setting of document data (YES in step S1801), and then the processing proceeds to step S411. In the other cases (NO in step S1801), the processing proceeds to step S1803.

Figure 19B:
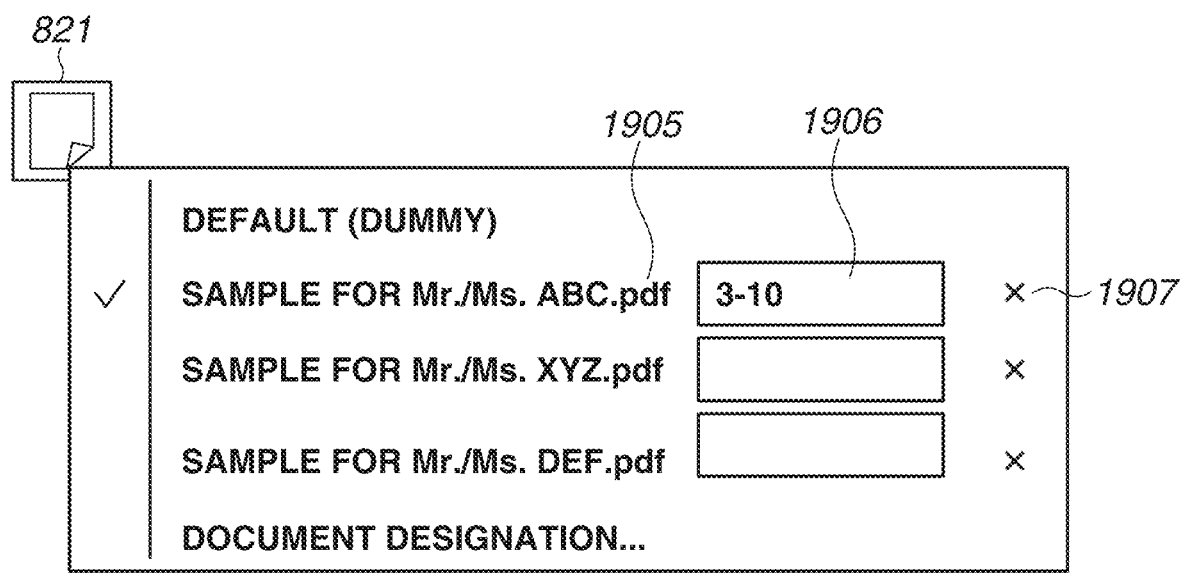

In step S1802, the document data designated in step S411 is stored in the memory, and file names of the document data are added as menu items on the document data setting menu 1901. FIG. 19B illustrates a state where file names of the document data designated on the document data setting menu 1901 are added. Also in FIG. 19B, the file names of the document data are added in the vicinity of the document data designation button 821 on the screen illustrated in FIG. 8A, like the diagram illustrated in FIG. 19A. The document data setting menu 1901 illustrated in FIG. 19B includes a file name 1905 indicating the file name of document data, a page range designation control area 1906 for designating a range of pages of document data as described below, and a cancel button 1907 for cancelling the document data as described below.

In step S1803, it is determined whether the received editing operation corresponds to changing the document data to be used for preview display. Upon receiving, from the UI unit 302, information indicating that the file name 1905 of document data is pressed on the document data setting menu 1901, the workflow editing unit 303 determines that the editing operation corresponds to changing the document data (YES in step S1803), and then the processing proceeds to step S1804. In the other cases (NO in step S1803), the processing proceeds to step S1805.

In step S1804, the document data designated in step S1804 is acquired from the memory. The workflow editing unit 303 acquires the document data designated in step S1804 from the RAM 203.

In step S1805, it is determined whether the received editing operation corresponds to designation of the range of pages of document data. Upon receiving, from the UI unit 302, information indicating that the range of pages is input to the page range designation control area 1906 for the corresponding document data on the document data setting menu 1901, the workflow editing unit 303 determines that the editing operation corresponds to designation of the range of pages of document data (YES in step S1805), and then the processing proceeds to step S1806. In the other cases (NO in step S1805), the processing proceeds to step S1807.

In step S1806, page data indicating the designated range of pages of document data is acquired. The workflow editing unit 303 acquires the document data that is designated in step S1805 and is stored in the memory, and extracts the page data of the designated range of pages. The workflow editing unit 303 replaces the extracted page data as preview data in step S1802. The processing of calculating the number of pages based on the number of pages of the document data in step S415 is also performed based on the number of pages of page data extracted in step S1806.

In step S1807, it is determined whether the received editing operation corresponds to designation of cancellation of document data. Upon receiving, from the UI unit 302, information indicating that the cancel button 1907 for the document data is pressed on the document data setting menu 1901, the workflow editing unit 303 determines that cancellation of the document data is designated (YES in step S1807), and then the processing proceeds to step S1808. In the other cases (NO in step S1807), the processing proceeds to step S419.

In step S1808, the document data for which the cancellation is designated is deleted from the memory. The workflow editing unit 303 deletes the document data designated in step S1808 from the RAM 203. In addition, the file name of the designated document data is deleted from the document data setting menu 1901.

In step S1809, it is determined whether the received editing operation corresponds to designation of display of dummy data. Upon receiving, from the UI unit 302, information indicating that the default menu 1902 for instructing display of a dummy page is pressed on the document data setting menu 1901, the workflow editing unit 303 determines that display of dummy data is instructed (YES in step S1809), and then the processing proceeds to step S421. In the other cases (NO in step S1809), the processing proceeds to step S423.

With the processing described above, preview document data can be designated in switched in a menu format, and thus workflow settings can be checked with a simpler operation by displaying a preview while switching the document data corresponding to a plurality of orders. Furthermore, the range of pages of preview document data can be designated, and if the same document data includes different pieces of data on the front cover and the body, the page of the front cover and the pages of the body can be designated separately.

A third exemplary embodiment of the present disclosure will now be described. Descriptions of the same components as those of the first and second exemplary embodiments are omitted as needed. The third exemplary embodiment illustrates processing for setting document data also for other parts when preview document data is designated.

Figures 20, 20A, 20B:
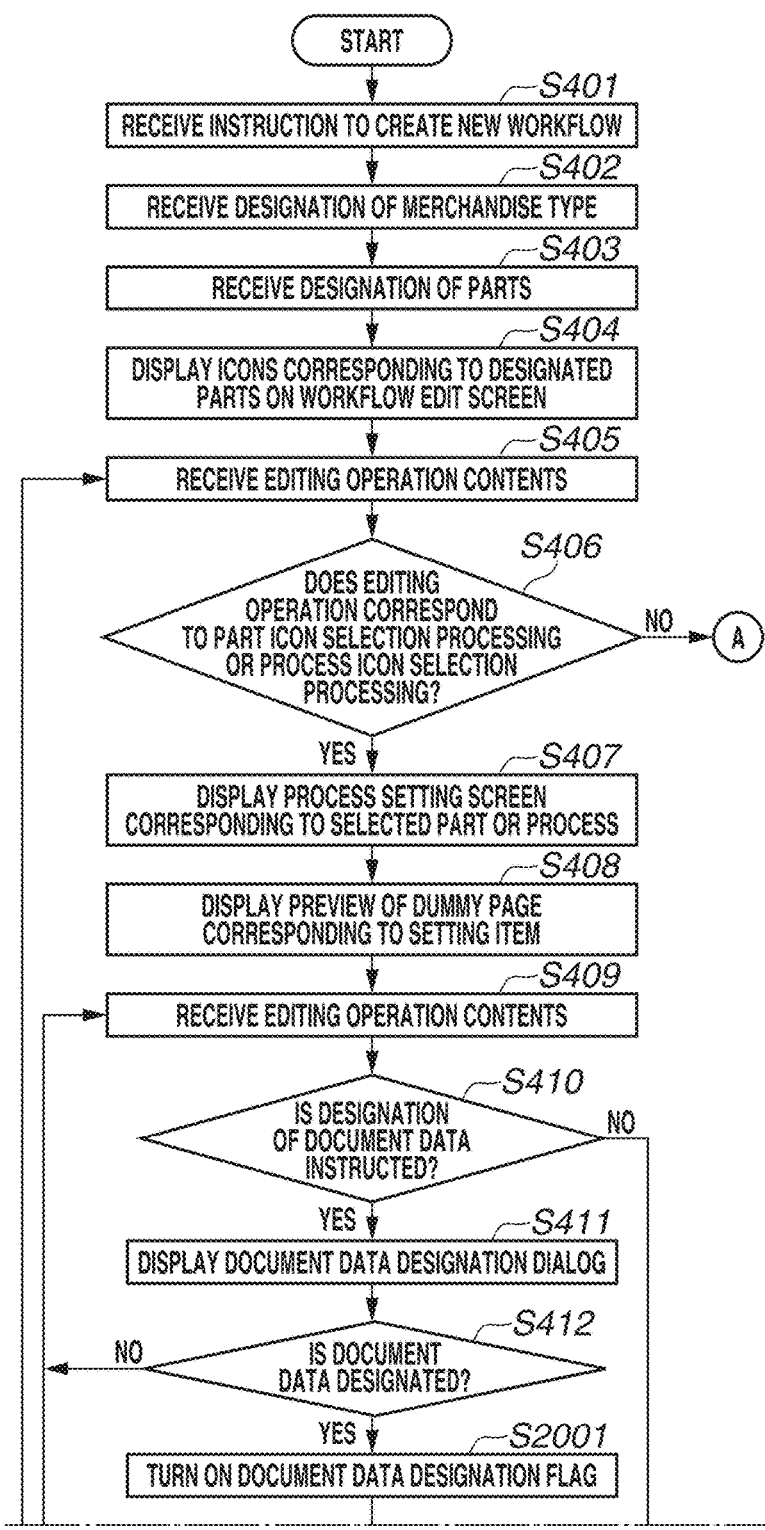
FIG. 20 is a diagram including the flowcharts of FIGS. 20A and 20B illustrating workflow creation processing according to a third exemplary embodiment of the present disclosure.
Figure 20B:
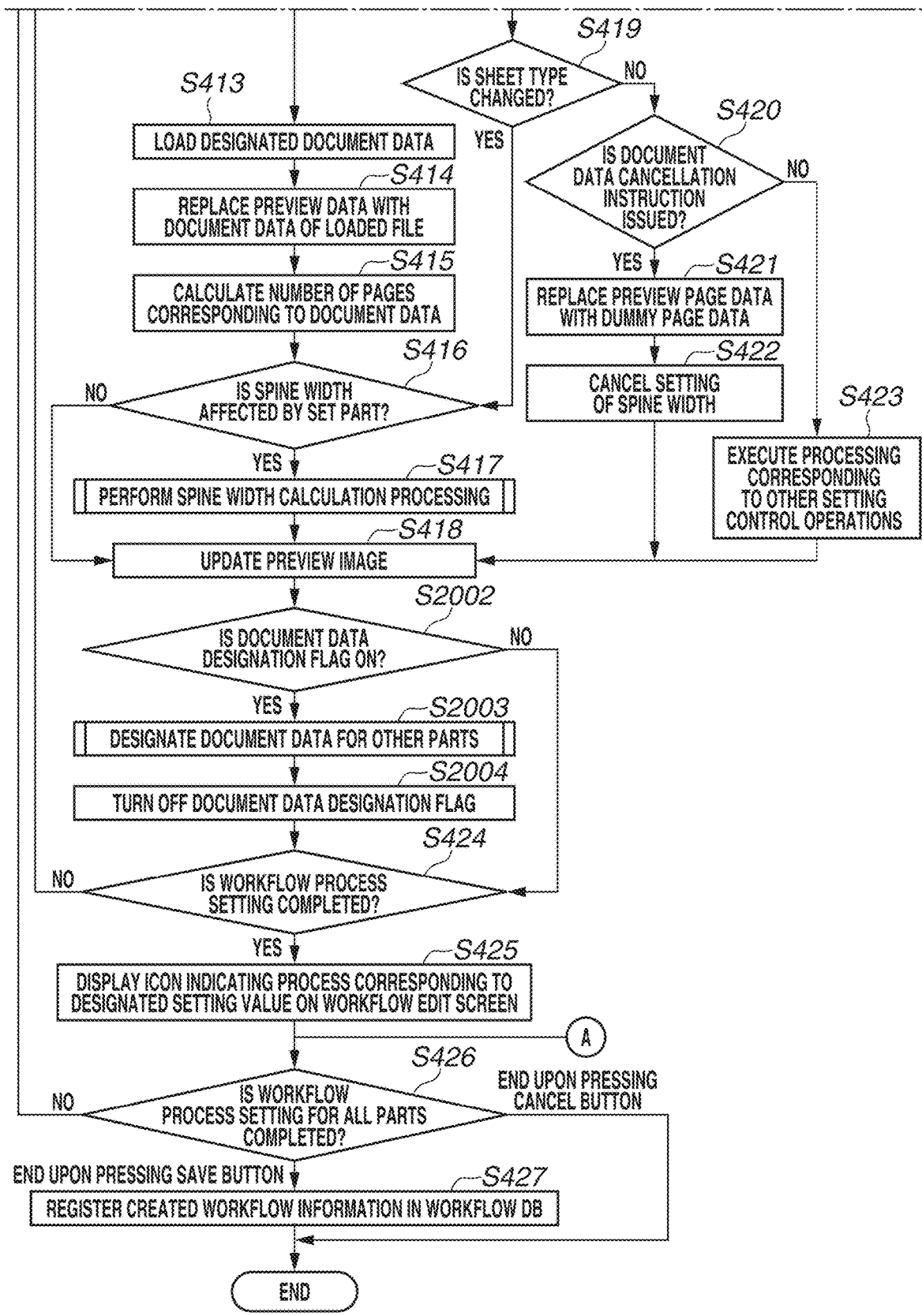

FIG. 20 is a diagram including the flowcharts of FIGS. 20A and 20B illustrating workflow setting and registration processing performed by the workflow setting application 301 according to the third exemplary embodiment. The processing will be described with reference to FIGS. 21 and 6. The same processes as those of the first exemplary embodiment illustrated in FIG. 4 are denoted by the same step numbers, and redundant descriptions thereof are omitted as needed.

In step S2001, a document data designation flag is turned on. In a case where it is determined that the designation of preview document data is executed in the editing operation received from the user, the workflow editing unit 303 sets the document data designation flag to ON. The document data designation flag is data temporarily stored in the RAM 203 during execution of the workflow editing application, and OFF is set as an initial value for the document data designation flag.

In step S2002, it is determined whether the document data designation flag is ON. The workflow editing unit 303 accesses the document data designation flag in the RAM 203. In a case where the setting value of the document data designation flag is ON (YES in step S2002), the processing proceeds to step S2003. In a case where the setting value of the document data designation flag is OFF (NO in step S2002), the processing proceeds to step S424.

In step S2003, document data is designated for other parts. Details of this processing will be described below.

In step S2004, the document data designation flag is turned off. The workflow editing unit 303 sets the document data designation flag to OFF.

FIG. 21 is a flowchart illustrating processing for designating document data for other parts. Each processing step will be described. The same processing steps as those of the first exemplary embodiment illustrated in FIG. 4 are denoted by the same step numbers, and redundant descriptions thereof are omitted as needed.

Figure 6:
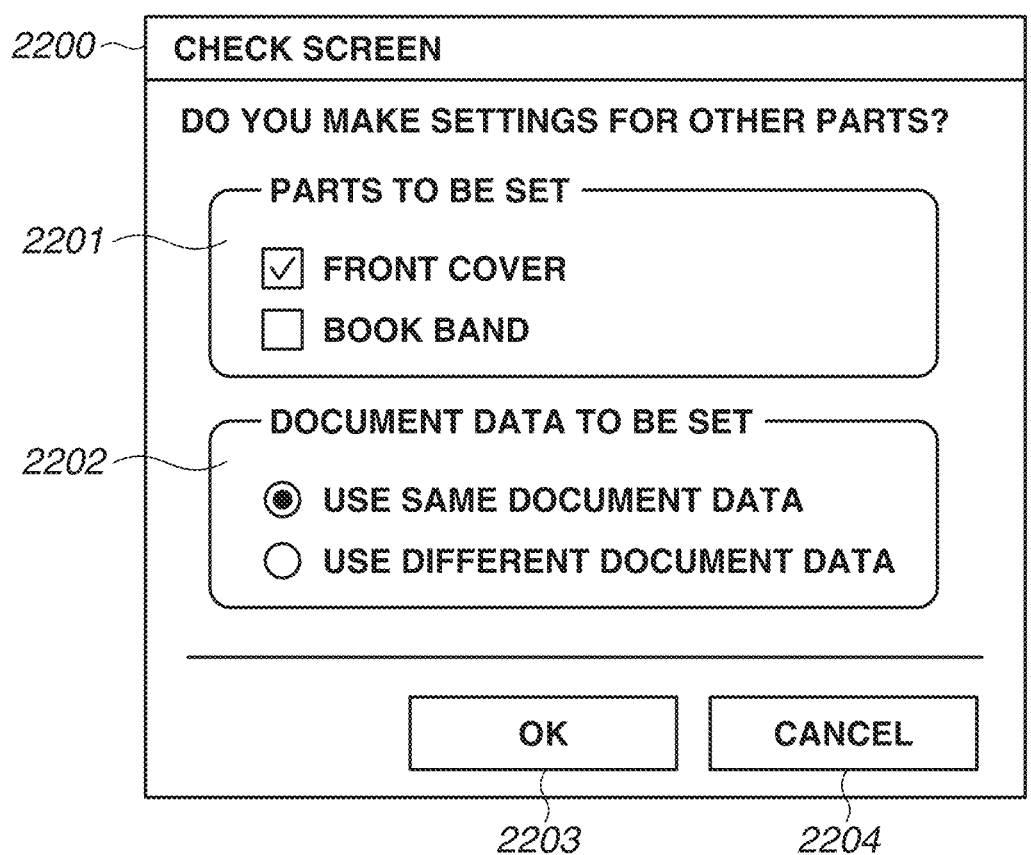
FIG. 6 is a diagram illustrating an example of an other parts check screen.

In step S2101, an other parts check screen is displayed. The workflow editing unit 303 displays the other parts check screen on the display 207 via the UI unit 302. FIG. 6 illustrates an example of the other parts check screen. The other parts check screen includes an other parts check screen 2200, and a parts designation control area 2201 in which other parts set in the workflow are displayed. The workflow editing unit 303 acquires information about other parts set in the workflow being edited, and displays the acquired information in the parts designation control area 2201. For example, in the workflow in which front cover, body, and book band parts are set, the front cover and the book band are displayed when the body is edited. The other parts check screen also includes a document data control area 2202 for designating the same document data or different document data as document data to be set for other parts, an OK button 2203 for determining the setting and moving to the subsequent processing, and a cancel button 2204 for discarding the setting and moving to the subsequent processing.

In step S2102, it is determined whether to apply document data to other parts. Upon receiving, from the UI unit 302, information indicating that the OK button 2203 is pressed in a state where at least one part displayed in the parts designation control area 2201 is designated, the workflow editing unit 303 determines that the document data is applied to other parts (YES in step S2102), and then the processing proceeds to step S2103. Meanwhile, upon receiving information indicating that the cancel button 2204 is pressed, the workflow editing unit 303 determines that the application of the document data to other parts is cancelled (NO in step S2102), and then the processing of the flowchart is terminated.

In step S2103, it is determined whether the same document data or different document data is used as document data to be designated for other parts. At the timing when the information indicating that the OK button 2203 is pressed is received in step S2102, a setting value designated in a document data designation control operation is acquired via the UI unit 302. In a case where the acquired setting value indicates that the same document data is used (YES in step S2103), the processing proceeds to step S413. In a case where the acquired setting value indicates that different document data is used (NO in step S2103), the processing proceeds to step S411. In the case of using different document data, in the processing of steps S411 and S412, the document data stored in the HDD 204 or the file server connected via the network 100 is set via the document data designation dialog 901.

In step S2104, it is determined whether the setting of document data for all the other parts received in step S2102 is completed. In a case where the workflow editing unit 303 has completed the setting of document data for all the other parts (YES in step S2104), the processing proceeds to step S418. In a case where the setting document data for all the other parts is not completed (NO in step S2104), the processing returns to step S414. For example, if document data is set for other parts, i.e., the front cover part and the book band part, in the body editing operation, the document data setting processing and spine width processing are executed on each of the front cover and the book band in steps S414 to S417.

The processing described above enables the user to designate document data also for other arts in the workflow at the same time when the preview document data is designated. Consequently, the number of operation steps for setting document data in the workflow can be reduced.

According to the exemplary embodiments described above, determination of whether there is a need to make a setting for a workflow including a plurality of work processes for producing a product for each product type can be performed, without performing printing using document data to be printed for the workflow.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-048748, filed Mar. 15, 2019, which is hereby incorporated by reference herein in its entirety.

What is claimed is:

1. An information processing apparatus comprising:
    a first reception unit configured to receive, by a user operation, a setting of a parameter for a plurality of work processes for producing a product in a workflow;
    a first preview display unit configured to display a preview using the setting received by the first reception unit and predetermined dummy data;
    a second reception unit configured to receive a designation of one of a plurality of pieces of document data by a user operation; and
    a second preview display unit configured to replace the dummy data with the document data received by the second reception unit and display a preview using the setting received by the first reception unit and the document data, wherein the document data received by the second reception unit is data including a plurality of pages, a number of which is different from a number of pages of the dummy data, and wherein the second preview display unit controls a number of displayable pages and displays the preview based on the number of pages of the received document data.

2. The information processing apparatus according to claim 1, wherein the second preview display unit displays the preview using a setting value adjusted based on a spine width of a product, the setting value being obtained based on information about the number of pages of the designated document data and a set sheet type.

3. The information processing apparatus according to claim 1, wherein the second reception unit receives the designation of one of the plurality of pieces of document data for each of parts included in the workflow.

4. The information processing apparatus according to claim 1, wherein the second reception unit receives a designation of one of the plurality of pieces of document data, and receives a range of pages of the designated document data.

5. The information processing apparatus according to claim 1, further comprising:
    a generation unit configured to generate the workflow for each of a plurality of product types.

6. A control method of an information processing apparatus, comprising:
    receiving, by a user operation, as first receiving, a setting of a parameter for a plurality of work processes for producing a product in a workflow;
    displaying, as first displaying, a preview using the received setting and predetermined dummy data;

receiving, as second receiving, a designation of one of a plurality of pieces of document data by a user operation; and replacing the dummy data with the document data received by the second receiving and displaying as second displaying, a preview using the setting received by the first receiving and the document data, wherein the document data received by the second receiving is data including a plurality of pages, a number of which is different from a number of pages of the dummy data, and controlling a number of displayable pages, wherein the preview in the second displaying is displayed based on the number of pages of the received document data.

7. The control method of the information processing apparatus according to claim 6, wherein the preview in the second displaying is displayed using a setting value adjusted based on a spine width of a product, the setting value being obtained based on information about the number of pages of the designated document data and a set sheet type.

8. The control method of the information processing apparatus according to claim 6, wherein, in the second receiving, the designation of one of the plurality of pieces of document data is received for each of parts included in the workflow.

9. The control method of the information processing apparatus according to claim 6, wherein, in the second receiving, the designation of one of the plurality of pieces of document data is received and a range of pages of the designated document data is received.

10. The control method according to claim 6, further comprising:

generating the workflow for each of a plurality of product types.

11. A non-transitory computer-readable storage medium storing a program for causing a computer to implement:
a first reception unit configured to receive, by a user operation, a setting of a parameter for a plurality of work processes for producing a product in a workflow;
a first preview display unit configured to display a preview using the setting received by the first reception unit and predetermined dummy data;
a second reception unit configured to receive a designation of one of a plurality of pieces of document data by a user operation; and
a second preview display unit configured to replace the dummy data with the document data received by the second reception unit and display a preview using the setting received by the first reception unit and the document data, wherein the document data received by the second reception unit is data including a plurality of pages, a number of which is different from a number of pages of the dummy data, and wherein the second preview display unit controls a number of displayable pages and displays the preview based on the number of pages of the received document data.

12. The non-transitory computer-readable storage medium according to claim 11, wherein the program for causing the computer to further implement:
a generation unit configured to generate the workflow for each of a plurality of product types.

* * * * *